US008812155B2

(12) United States Patent
Brethe

(10) Patent No.: US 8,812,155 B2
(45) Date of Patent: Aug. 19, 2014

(54) MANIPULATOR ROBOT AND ASSOCIATED CONTROL FOR FINE POSITIONING OF THE TERMINAL END

(75) Inventor: Jean-François Brethe, Sanneville (FR)

(73) Assignee: Universite du Havre, Le Havre (FR)

( * ) Notice: Subject to any disclaimer, the term of this patent is extended or adjusted under 35 U.S.C. 154(b) by 835 days.

(21) Appl. No.: 12/989,203

(22) PCT Filed: Apr. 17, 2009

(86) PCT No.: PCT/FR2009/000459
§ 371 (c)(1),
(2), (4) Date: Jan. 3, 2011

(87) PCT Pub. No.: WO2009/136017
PCT Pub. Date: Nov. 12, 2009

(65) Prior Publication Data
US 2011/0106305 A1    May 5, 2011

(30) Foreign Application Priority Data

Apr. 24, 2008  (FR) ..................................... 08 52750

(51) Int. Cl.
*G06F 19/00*    (2011.01)
*B25J 17/00*    (2006.01)
*B25J 9/10*     (2006.01)
(52) U.S. Cl.
CPC .............. *B25J 9/1015* (2013.01); *Y10S 901/08* (2013.01); *Y10S 901/09* (2013.01)
USPC .................. 700/245; 74/490.01; 901/8; 901/9

(58) Field of Classification Search
USPC ........................... 901/8, 9, 14, 15; 74/490.01
See application file for complete search history.

(56) References Cited

U.S. PATENT DOCUMENTS

| | | | | |
|---|---|---|---|---|
| 4,523,100 A | * | 6/1985 | Payne | 250/559.33 |
| 5,016,489 A | | 5/1991 | Yoda | |
| 5,740,062 A | * | 4/1998 | Berken et al. | 700/218 |
| 2004/0093119 A1 | * | 5/2004 | Gunnarsson et al. | 700/245 |

FOREIGN PATENT DOCUMENTS

JP    03-228588    10/1991

OTHER PUBLICATIONS

Cai Hegao et al.; "The Implementation of Active/Passive Coordinated Manipulation in Precision Assembly Based on Force-Feedback;" Industrial Electronics, 1992, Proceedings of the IEEE International Symposium on Xian, China, May 25-29, 1992, New York, NY, XP010045417, May 25, 1992; pp. 347-351.

* cited by examiner

*Primary Examiner* — Calvin Cheung
*Assistant Examiner* — Basil T Jos
(74) *Attorney, Agent, or Firm* — Harness, Dickey & Pierce, P.L.C.

(57) ABSTRACT

The disclosure relates to a robot that has an articulated arm for moving an end in an N-dimensional space including at least N+1 motorized articulations, and a computer for controlling the movements of the motorized articulations. The computer controls a first step of prepositioning the terminal end of the articulated arm and a second step for its fine positioning.

17 Claims, 16 Drawing Sheets

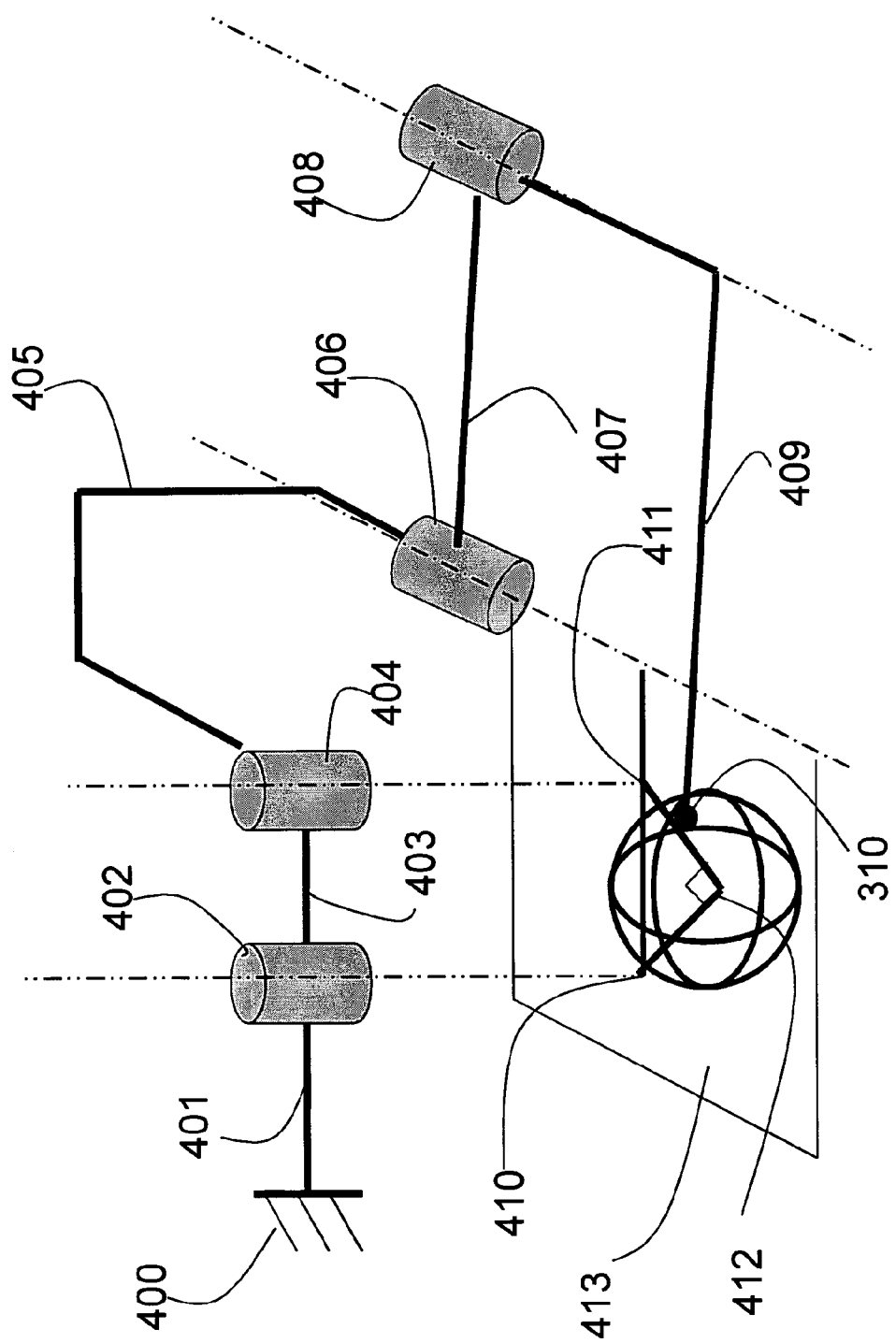

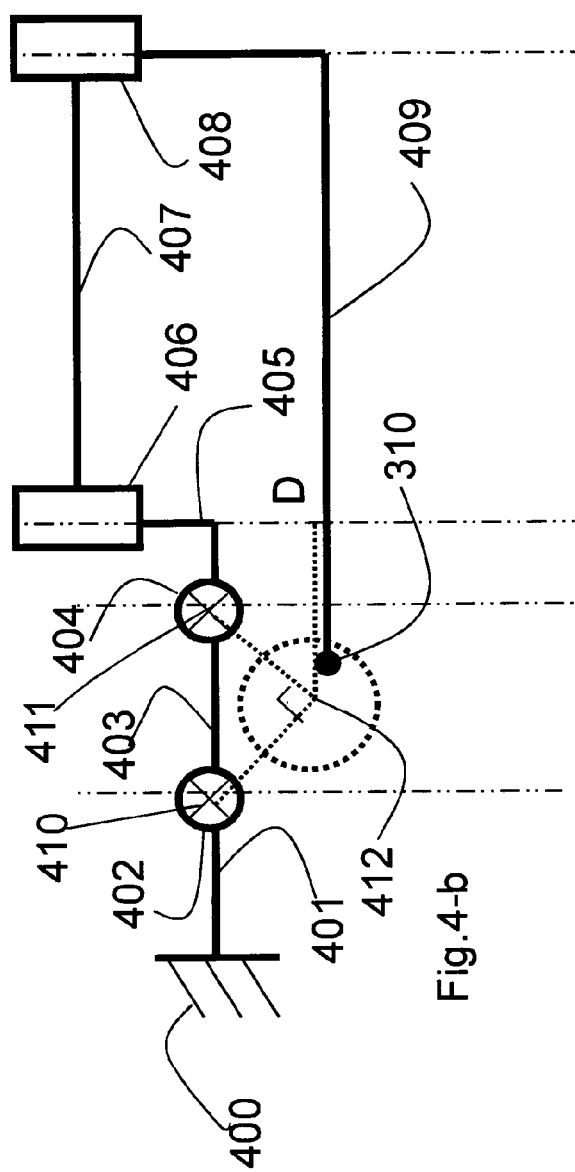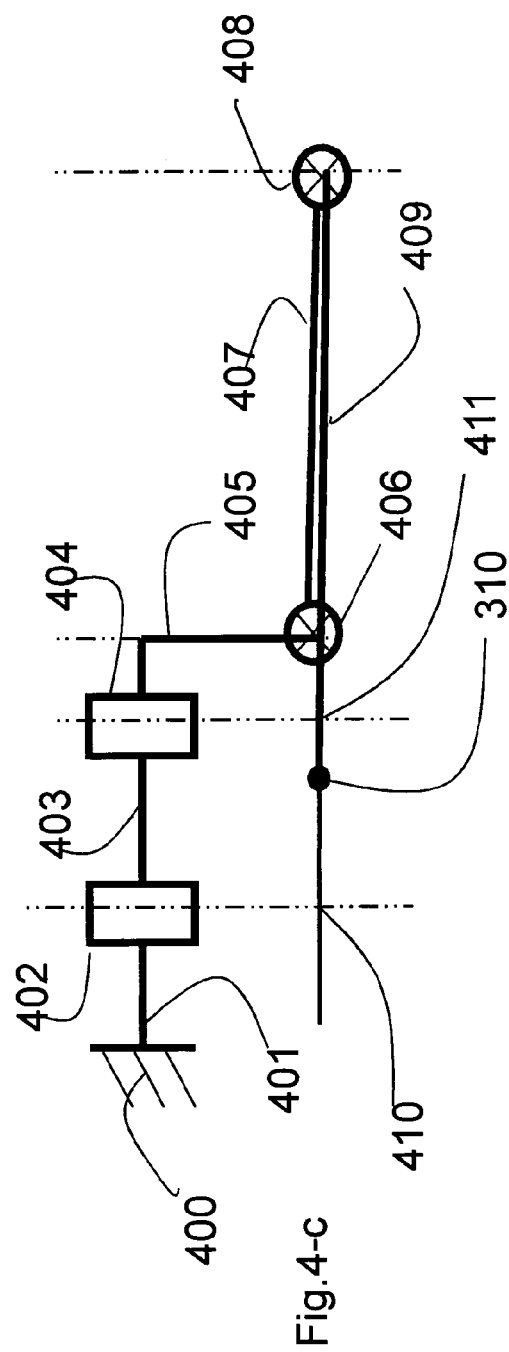
Fig.4-b
Fig.4-c

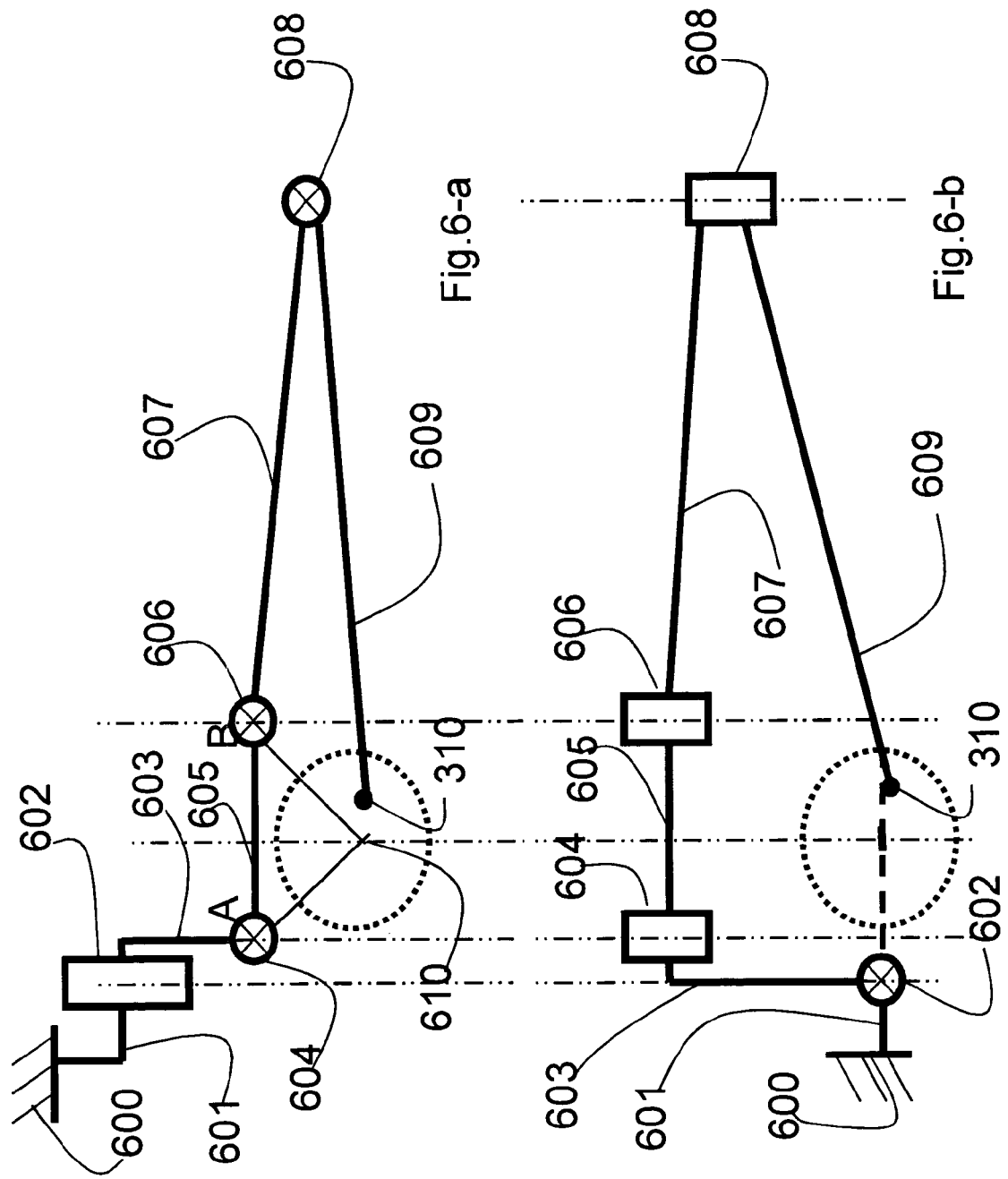

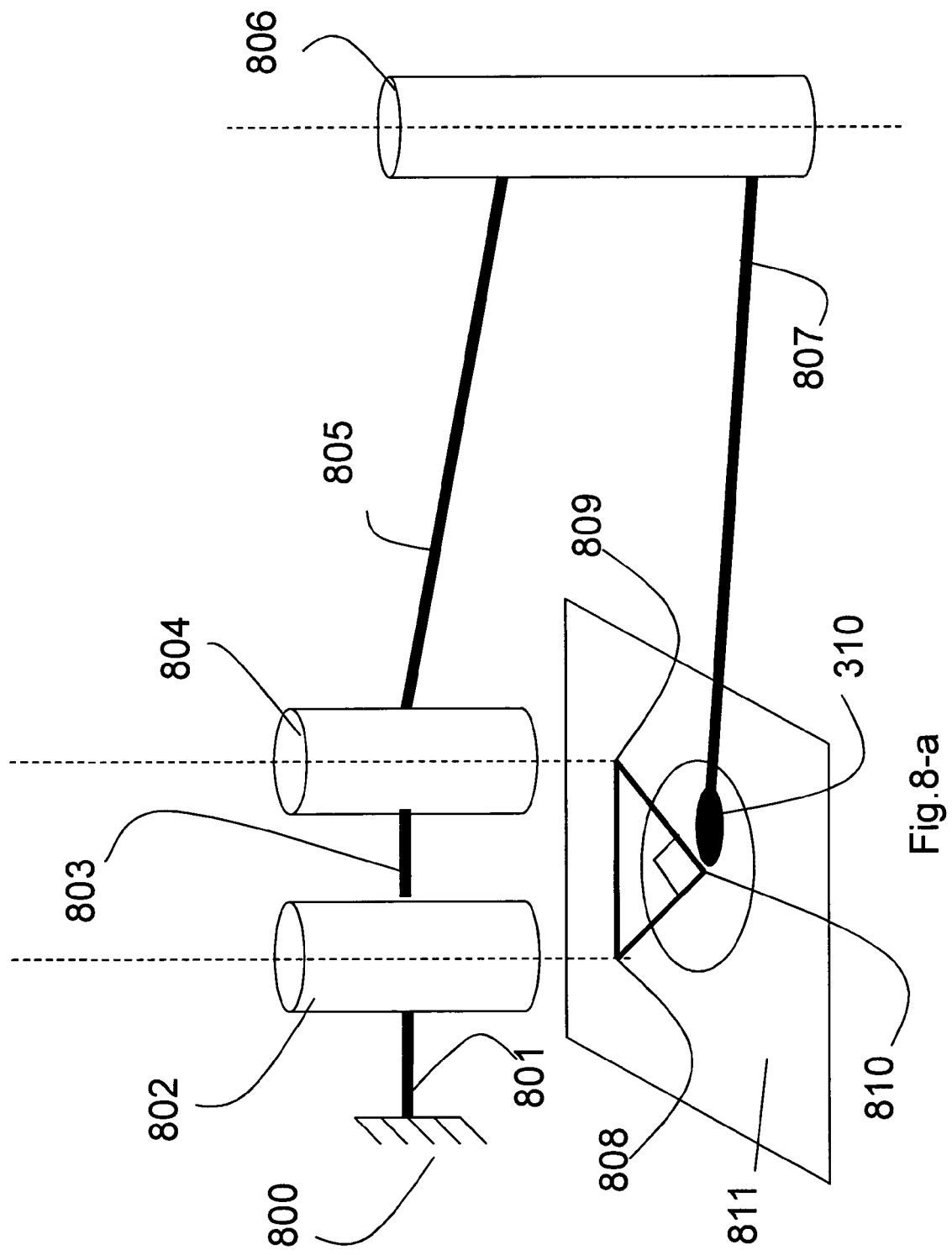
Fig.8-a

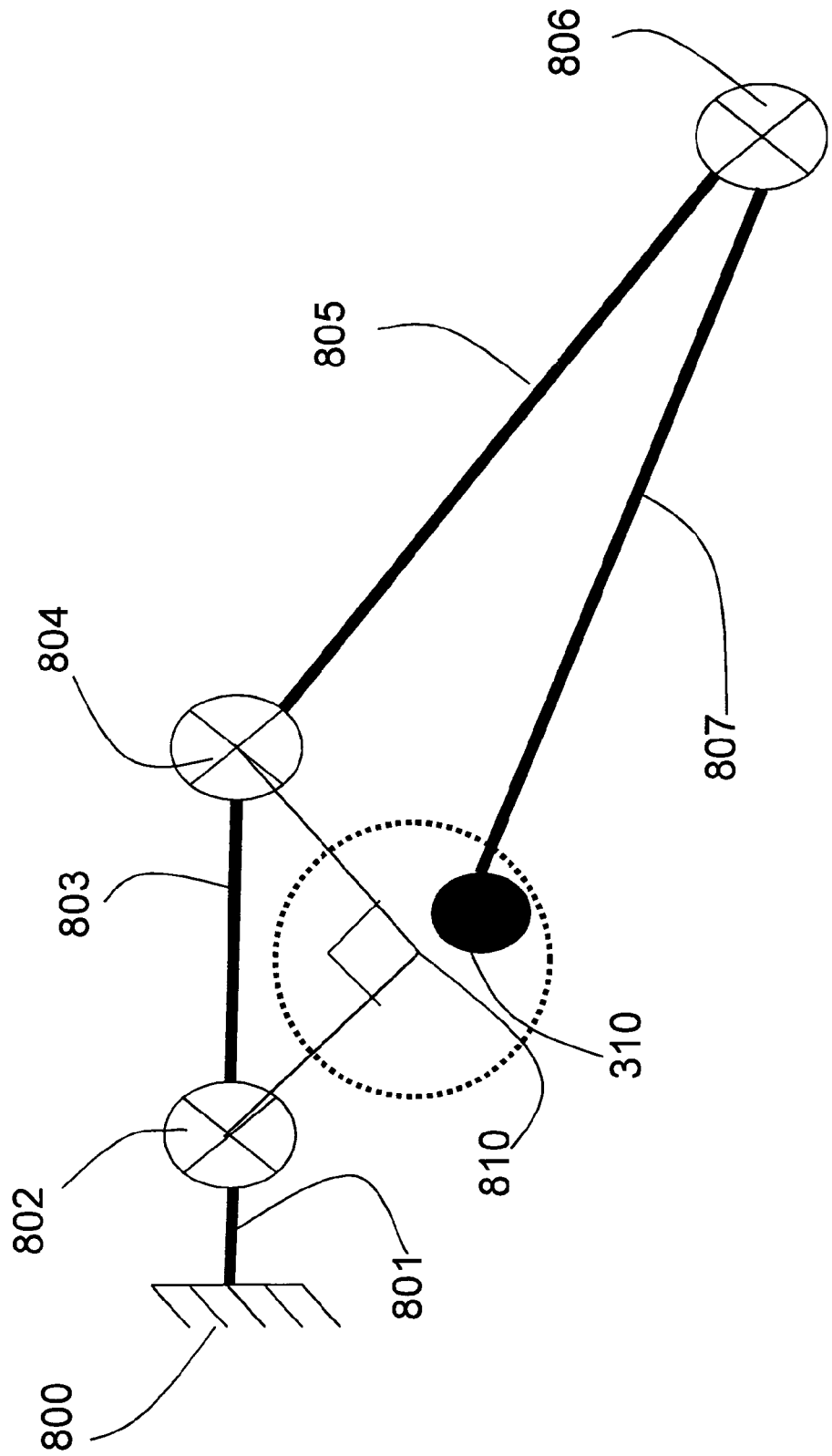
Fig.8-b

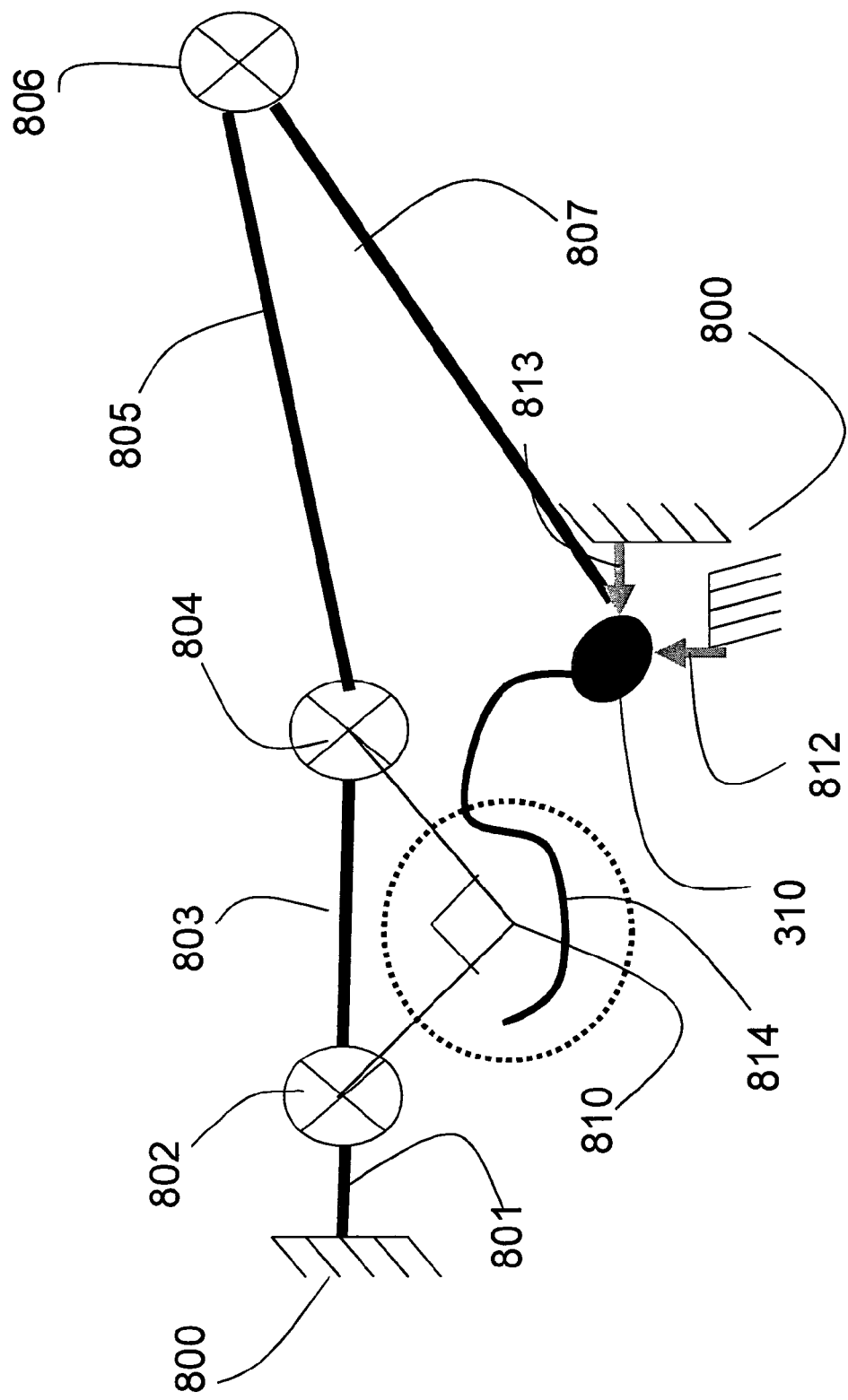
Fig.8-c

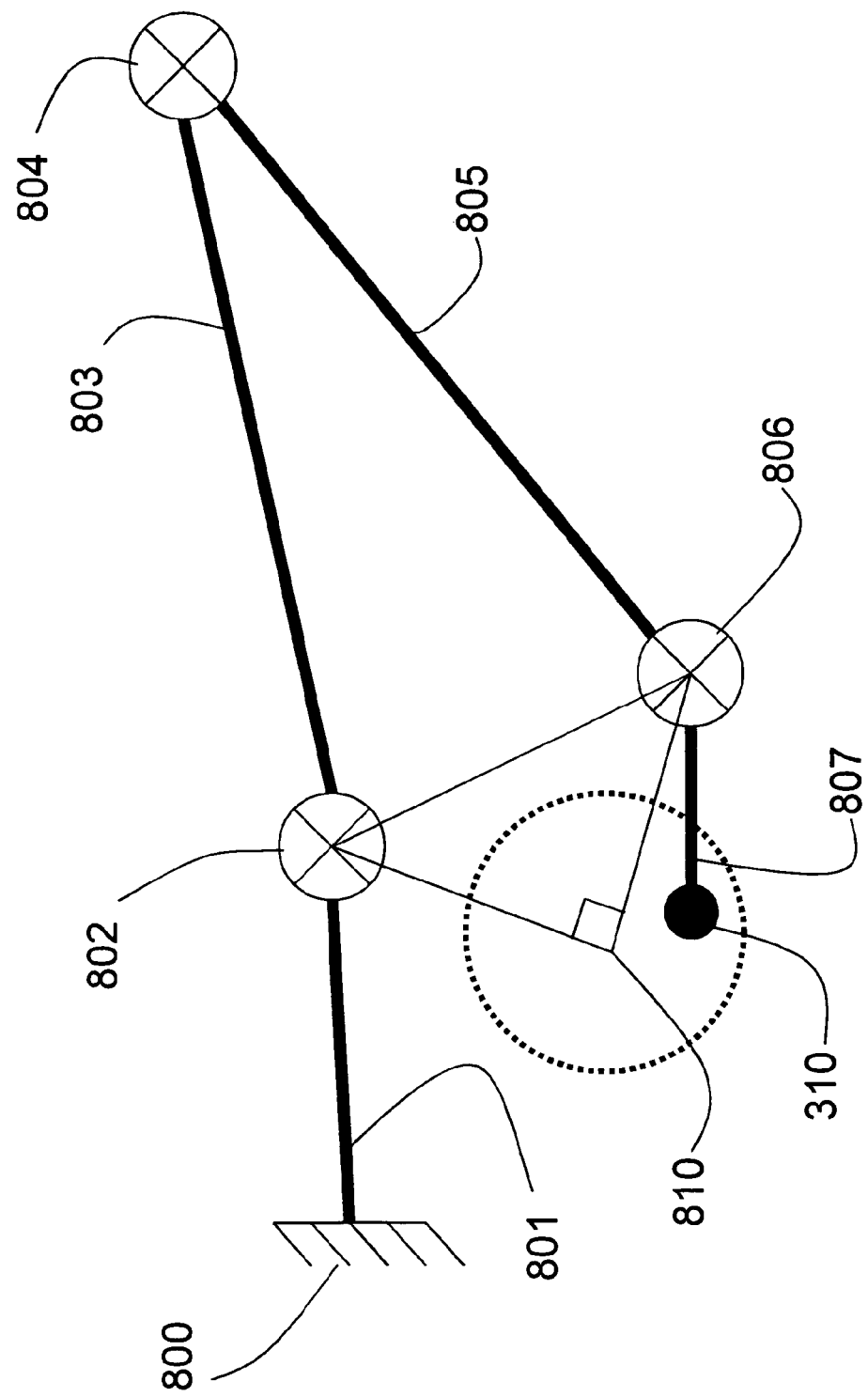
Fig.8-d

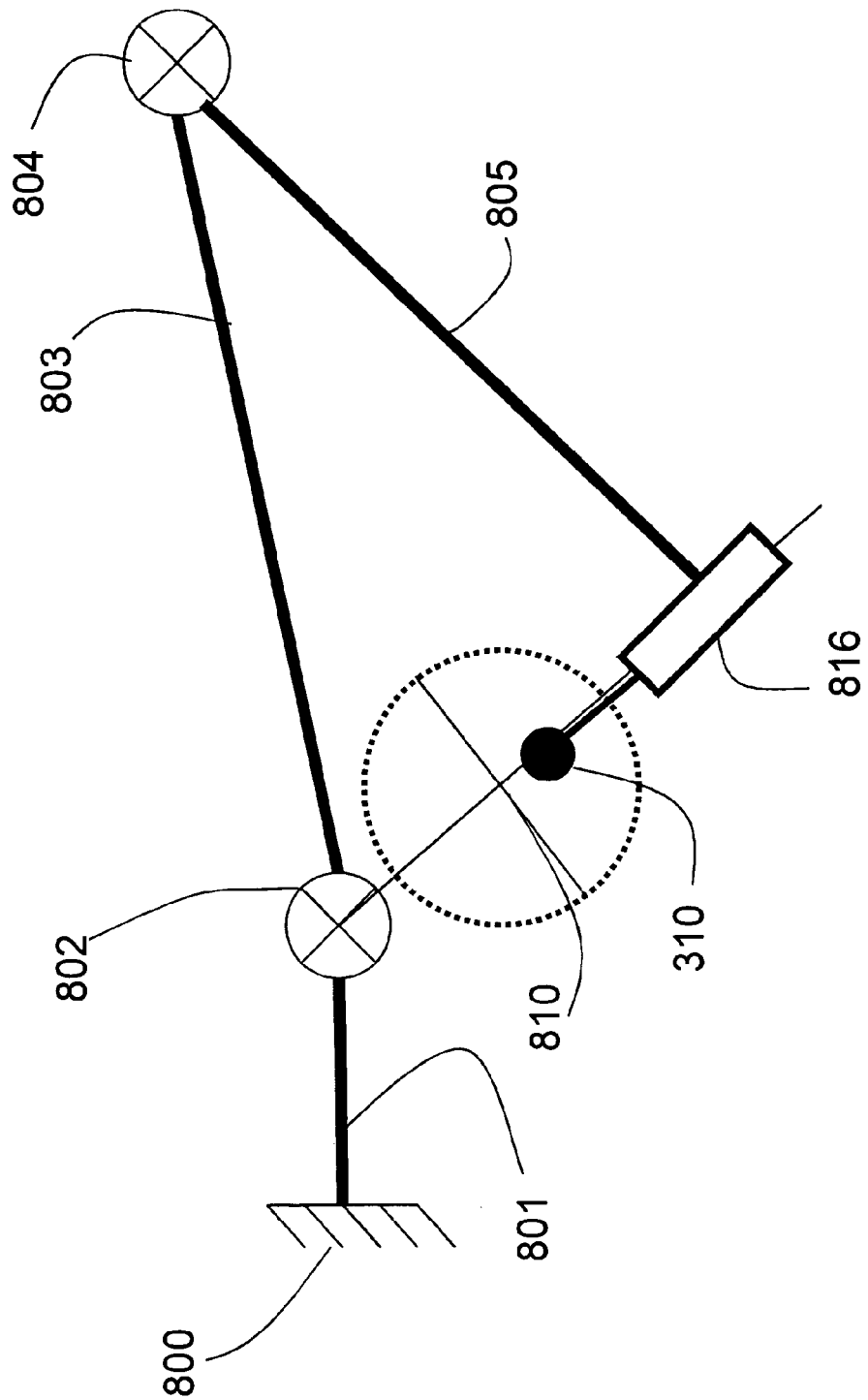
Fig.8-e

MANIPULATOR ROBOT AND ASSOCIATED CONTROL FOR FINE POSITIONING OF THE TERMINAL END

CROSS-REFERENCE TO RELATED APPLICATIONS

This application is a National Phase Entry of International Application No. PCT/FR2009/000459, filed on Apr. 17, 2009, which claims priority to French Application 08/52750, filed on Apr. 24, 2008, both of which are incorporated by reference herein.

TECHNICAL FIELD

The invention relates to the field of manipulator robots enabling the movement of a terminal end.

BACKGROUND

Manipulator robots are used for moving and positioning an object or a tool in space. They can have a serial, parallel or, less often, hybrid structure. In the case of serial structures, the various parts composing the robot are articulated with respect to each other, in series and the relative movements are obtained from actuators distributed along a kinematic chain. In the case of a parallel structure, several kinematic chains are closed and the elements constituting such chains are not necessarily all actuated.

The serial, hybrid or parallel manipulator robots have a certain number of degrees of robot flexibility making it possible to obtain degrees of freedom for the object to be handled. Most serial robots sold on an industrial scale are:
  either of the SCARA type, with two mobile arms in a plane and a degree of robot flexibility in a direction perpendicular to such plane (possibly completed by rotation about such latter axis) making it possible to position and orient a solid in planes parallel to a base plane
  or of the anthropomorphic type, with a base, a shoulder and an arm supporting a wrist finally giving six degrees of robot flexibility (three for the position, three for the orientation).

A robot can be redundant if the number of degrees of robot flexibility (in relation with the number of actuators) is greater than the number of degrees of freedom obtained for the handled solid. Generally speaking, such robots are difficult to control but make it possible to avoid obstacles located in the working space or to work in hardly accessible spaces.

Standard ISO 9283 defines the performance criteria to be taken into account for an industrial robot, more particularly the reproducibility and the accuracy in the positioning. So far, the reproducibility of the positioning of the manipulator robots, whether serial or parallel, redundant or not, does not exceed a value close to one hundredth of a millimeter. As for the accuracy performances, they are even lower and today the best robots can guarantee only an exact positioning within 0.03 millimeters in the working space. In fields such as clockmaking, where it is necessary to insert axes into holes 0.2 millimeters in diameter, or in the optoelectronic field, a reproducibility of less than 0.01 millimeters and accuracy in the positioning of the order of 0.01 millimeters are essential.

For some so-called singular configurations, the number of degrees of freedom of the terminal end of the robot is locally strictly lower than the number of degrees of robot flexibility. The Jacobean matrix is the matrix resulting from the differentiation of the geometric model of the robot; it is no longer revertible in singular positions. This raises a problem when, for example, the robot is controlled by a revertible differential model. Then, the terminal end of a robot is generally not positioned in areas close to the singular configurations because of the underlying control problems.

The document U.S. Pat. No. 4,523,100 is known in the prior art, which discloses a robot including an articulated arm supporting an articulated head for micro-movements. The articulated arm provides a rough positioning of the articulated head, and the accurate positioning is provided by linear verniers, composing the articulations of the head. Such robot has the drawback of requiring at least 6 articulations of a different nature. In so-called micro/macro devices used for accurately positioning an object in a three-dimensional space, the fine movements of the terminal ends are generally provided by an independent micrometric device fixed downstream of the kinematic chain; the assembly requires a minimum of three articulations of the supporting structure for positioning the micrometric device and the micrometric device itself includes three articulations, which means generally 6 articulations.

SUMMARY

The invention aims at remedying the drawbacks of the state of the art and more particularly at bringing an accurate positioning of the terminal end of redundant robots, which results in improved performances in accuracy (reproducibility and exact positioning) with respect to the prior art. In addition, the present invention makes it possible to work in areas close to the base or singular configurations of the robot structure. With respect to the macro/micro devices, the invention makes it possible to substantially reduce the number of articulations used for the fine positioning by providing an integrated architecture.

The invention relates to totally integrated and redundant robot structures for which a so-called "area of interest" exists, wherein the fine positioning of the terminal end of the robot can be obtained. The area of interest does not cover the whole working space accessible by the end of the robot, but a preferred volume of action within which the end of the robot may run along any path of motion, unlike the solution disclosed in U.S. Pat. No. 4,523,100. The invention relates to a robot including an articulated arm for the movement of an end in an N-dimensional space comprising at least N+1 motorized articulations, as well as a computer for controlling the movements of said motorized articulations, with said computer controlling a first step of prepositioning the terminal end of the articulated arm and a second step of fine positioning.

Said first step of prepositioning consists in engaging the end of an articulated arm in the area of interest, as close as possible to the centre of the optimum positioning area, with the centre being defined as a function of N secondary motorized articulations, with at least one of said secondary articulations being an axis of rotation. Said second step of fine positioning consists in blocking all the articulations except for said N secondary motorized articulations and in controlling the movement of the terminal end by elementary movements of at least one of the N secondary articulations.

In particular embodiments:
  the articulated arm for a positioning in a three-dimensional space includes at least four motorized articulations, among which at least two axes of rotation, with the first step of prepositioning consisting in bringing the terminal end of the robot in the area of interest, with said area of interest being a sub-assembly of the working space, and in that the second step of fine positioning consists in blocking all the articulations except for three secondary motorized articulations, among which said two axes of rotation, and in carrying out the final positioning through elementary movements of at least one of said secondary articulations;

the articulated arm for positioning in a three-dimensional space includes at least four motorized articulations, among which at least one axis of rotation, the first step of prepositioning consisting in bringing the terminal end of the robot to the area of interest, said area of interest being a sub-assembly of the working space and in that the second step of fine positioning consists in blocking all the articulations except for three secondary motorized articulations, among which said axis of rotation, and in executing the final positioning through elementary movements of said secondary articulations;

the articulated structure includes at least three motorized articulations among which at least two so-called secondary parallel axes of rotation, and in that the first step of prepositioning consists in bringing the terminal end of the robot to the area of interest; a second step of fine positioning consisting in blocking all the motorized articulations except for said secondary motorized axes of rotation, and in carrying out the final positioning through elementary movements by the rotation of at least one of said secondary axes;

the articulated arm for a positioning in a plane of a space includes at least three motorized articulations, among which at least one axis of rotation, with the first step of prepositioning consisting in bringing the terminal end of the robot to the area of interest, with said area of interest being a sub-assembly of the working space, and in that the second step of fine positioning consists in blocking all the articulations except for two secondary motorized articulations, among which said axis of rotation, and in executing the final positioning through elementary movements of at least one of said secondary articulations;

the articulated arm for a positioning in a three-dimensional space includes at least four serial motorized articulations, among which at least 3 so-called secondary axes of rotation, with a first step of prepositioning consisting in bringing the terminal end of the robot to an area of interest, with said area of interest being a sub-assembly of the working space, wherein the lever arms with respect to the three secondary axes of rotation have a small length and in that the second step of fine positioning consists in blocking all the articulations except for said secondary motorized axes of rotation, and in proceeding to the final positioning through elementary movements by rotation of at least one of said secondary axes;

the articulated arm includes at least three serial motorized articulations, among which at least two so-called secondary parallel axes of rotation, and in that the first step of prepositioning consists in bringing the terminal end of the robot to the area of interest, a fortiori to the optimum positioning area, with said optimum positioning area being a disc, the centre of which is the apex opposed to the hypotenuse of an isosceles right-angled triangle inscribed in a plane containing the terminal end of the handling arm and perpendicular to the secondary axes of rotation, with the hypotenuse having a first apex on the first secondary axis of rotation and a second apex on the second secondary axis of rotation; the diameter of said disc is approximately equal to the distance between the two secondary axes of rotation; the second step of fine positioning consisting in blocking all the motorized articulations except for said secondary motorized axes of rotation, and in carrying out the final positioning through elementary movements by rotation of at least one of said secondary axes;

said robot includes at least one additional articulation located upstream of the kinematic chain and an opening step enabling the definition of an area of interest through the action of such additional articulation or articulations;

the fine positioning is indirectly obtained through the reproduction of a portion of path of motion from a particular point called a point of harmonization to the target point, in order to solve the problems of dry frictions, with the harmonization point being a point located outside the dead zone linked to the target point;

the fine positioning is obtained by the processing of position exteroceptive information making it possible to deduce the distance between the position of the terminal end of the robot and the target point, and to control the robot through elementary rotations about the secondary axes;

both steps are computed prior to the execution in order to prepare a control law for a continuous movement;

both steps are calculated prior to the execution, in order to prepare a control law and a periodical re-computation during the movement;

the design of such a redundant robot for the fine positioning makes it possible to have a revertible geometric model at each step;

the control of the redundant robot for the fine positioning uses a local calibration process for a better accuracy in the positioning upon completion of the prepositioning phase;

a wrist is fixed at the end of the robot, which enables the control of the orientation of an object or a tool.

In other embodiments:

the secondary axes are selected as being those which have the smallest lever arm with respect to the target point;

the distance between both secondary axes being smaller than the distance between a secondary and a third axis, as well as the distance between the third axis and the terminal point;

the angular position sensors of the secondary articulations have a resolution which is greater than the resolution of the sensors of the other articulations;

the design of the redundant robot for the fine positioning in two steps makes it possible to have an invertible geometric model at each step because of the redundancy of two consecutive parallel axes of rotation on the kinematic chain.

The robotic structure is composed of at least three articulated segments in serial, hybrid or parallel mode according to a redundant configuration, of proprioceptive sensors making it possible to obtain information on the actuators of the kinematic chain and a computer making it possible to control said kinematic chain. Two types of articulations are defined at the kinematic chain composing the robotic structure: the articulations for the positioning and the orientation called primary articulations (of the rotary, prismatic type or any type of articulation known to the persons skilled in the art), then among those, some rotary articulations used for a precise positioning of the terminal end of a robot so-called secondary articulations. The selection of the secondary rotary articulations in the kinematic chain depends on the configuration of the robotic structure, with some rotary articulations which can be configured as secondary articulations for a given configuration and only for primary articulations for another configuration. The selection of the secondary axes is based on the principle that the distances between the secondary axes of rotation and the terminal end of the robot are small with respect to the distances between the non secondary axes of rotation and the terminal end of the robot.

In alternate embodiments, some secondary motorized rotary articulations can be replaced by prismatic links in order to enable an accurate positioning in a plane or the three-dimensional space, provided that at least one motorized rotary articulation remains among the secondary articulations; thus, for a fine positioning in the three-dimensional space, the secondary articulations can result from the combination of two rotary articulations and a motorized prismatic articulation as illustrated in FIG. 10 or a rotary articulation and two motorized prismatic articulations; for a positioning in the plane, the secondary articulations can result from the combination of one motorized rotary articulation and one motorized prismatic articulation as illustrated in FIG. 8-*e*.

The area of interest is a restricted area of the working space which intrinsically depends on the configuration of the robotic structure and for which the following properties are checked: the terminal end of the robot may be positioned in the area of interest; the space resolution of the position obtained by controlling the secondary axes of rotation is finer than in the remainder of the working space; the elementary vectorial movements induced by the elementary rotations about the secondary axes of rotation form a family generating vectors in space, ideally an orthogonal base. For a fine positioning in the three-dimensional space, three secondary articulations will be selected from the kinematic chain. For a fine positioning in a plane, two secondary articulations will be selected from the kinematic chain. For a fine positioning on a straight line, one secondary articulation will be selected in the kinematic chain. However, in such various cases, it may be necessary to choose more secondary articulations than previously defined, since the persons skilled in the art are capable of designing a control which can manage the local redundancy resulting from the elementary movements forming a family of vectors linked in the vectorial space of the requested movements, with the principles and the advantages of the invention remaining valid.

Within the area of interest, an optimum positioning area can be distinguished. The centre of the optimum positioning area is a particular point in the OPA located at the same distance from the secondary axes and for which the elementary vectorial movements induced by the elementary rotations about the secondary axes of rotation form an orthogonal base of vectors in space. Not all the redundant robotic structures have necessarily an area of interest, or a fortiori an OPA. For a given robotic structure, the area of interest and the OPA depend on the configuration of the kinematic chain. However, only a part of the working space may become an area of interest. The designer of the robotic structure must be careful and define the dimensions thereof so that the OPA can exist, have a sufficient volume and be accessible by movements and configurations according to the desired application. As for the user, he or she must select from all the possible configurations, the one that will enable him or her to make the area where the fine positioning is desired and the area of interest, or a fortiori the OPA coincide. The ideal is that the fine positioning is executed in a region close to the centre of the OPA.

When the final positioning is carried out at the centre of the OPA, the space control of the fine positioning is uncoupled with respect to the controls of the secondary axes. When getting further from the centre of the OPA while remaining in the area of interest, a partial coupling may appear. The invention relates to the fine positioning control which can be broken down into two independent steps: the first step, also called the prepositioning step, consists in bringing the terminal end of the handling arm to the area of interest, a fortiori to the OPA; the second step consists in finely positioning the terminal end of the handling arm only using one or several secondary articulations.

During the step of fine positioning, the secondary axes of rotation only are activated. Because of the present structure and with an equal resolution on the angular encoders, this enables a significant and computerized improvement of the reproducibility of the positioning estimated with respect to the secondary axes of rotation. On the other hand, at the centre of the OPA, the control between the Cartesian space and the secondary articulation space is uncoupled. This small value of the reproducibility in the positioning makes it possible to locally correct position errors by strictly limiting the non linearity intrinsic in the reproducibility "sphere". For example, a "jump" ellipsoid control can be used.

During the step of fine positioning, the information from the exteroceptive position sensors (mechanical, digital, optical or other micrometers, microscopes, viewing devices) can be integrated in the control system. The information from such sensors makes it possible to obtain the relative deviations between the desired final position and the position reached by the terminal end. FIG. 1 relates to a fine assembly table illustrating such a principle. The device includes an assembling plate 10, a first assembly formed of a North laser scanning micrometer 1 and a South laser scanning micrometer 2 associated to a laser beam 3, and a second assembly formed by an East laser scanning micrometer 4 and a West laser scanning micrometer 5 associated to a laser beam 6. The two (East-West, North-South) laser scanning micrometers make it possible to obtain the relative positions between a shaft 8 and a bore 9. This deviation can then be used within a control system to obtain the final position desired.

FIG. 2 illustrates various methods which can be implemented to correct the deviation between the desired position 201 and the reached position. Because of dry frictions, small deviations in the position of the articulations are sometimes difficult to correct. As for the server control, a proportionate control does not exert a sufficient stress (torque or force) to overcome the stress of the dry friction in an area called a dead zone shown here by the sphere 202 wherein there is no movement generated; it is necessary to wait for the integral corrective action of the servo-control finally generating sufficient efforts to cause a movement with the risk of subsequently inducing passing phenomena related to the dynamics of the system; this is the case of the path of motion 205 which makes it possible to go from the point 203 located in the dead zone to the point 204. Such passing may have secondary effects as regards safety and operation security. The final positioning 207 can be obtained by a direct control (for example a reverse differential control) if the origin of the path of motion 208 is outside the dead zone. If the reached position 209 is in the dead zone, it is possible obtain the fine positioning using the following process: a point of harmonization 210 is defined and located outside the dead zone obtained by the path of motion 211. The principle then consists in reproducing a path of motion 213 starting from such a point of harmonization 210 by adjusting the final setting as a function of the deviation measured between the reached position 212 and the target 201. The path of motion 214 is then used to go back to the point of harmonization 210. The final setting is then slightly modified, taking into account the deviation between the point 212 and the target 201. The path of motion 216 leads from the point of harmonization 210 to the point 215 which is the closest to the target 201. This process can be resumed until the final point is close enough to the target 201.

The accuracy of the position reached by the robot structure during the step of prepositioning remains that of a conventional manipulator robot. It can be significantly improved during the step of fine positioning in the area of interest by using a local calibration procedure. Such a procedure may, for example consist in accurately measuring the position of the terminal end with exteroceptive captors at a point of the area of interest and to deduce therefrom the variations in the position of the terminal end during the step of fine positioning by computerisation from the geometric (or differential) model, only based on the secondary axes. Other strategies can also be considered: several sensors distributed in the area of interest and coupled to various configurations making it possible to finally deduce the position of the terminal end in the area of interest while reducing the uncertainty relating to the non secondary articulations position sensors and to the errors in the geometric model on a part of the kinematics chain. Such local calibration must make it possible to reduce the importance of the errors in the geometric model related of the secondary axes by one order of magnitude.

It is possible to make the robot structure work as defined outside the area of interest, with the operation of the robot then being that of a conventional redundant robot without a fine positioning. The control of the articulations by the actuators is conventionally executed in closed loop using the proprioceptive information from the positions sensors (for example encoders) generally used on this type of robot. The orientation of an object or a tool fixed on the terminal end of the articulated arm can be conventionally controlled from the various articulations distributed on the kinematic chain. In an alternate embodiment, it can be considered to position a wrist on the terminal end of the robotised arm which makes it possible to control the orientation of an object or a tool fixed at the terminal end.

BRIEF DESCRIPTION OF THE FIGURES

Other characteristics and advantages of the invention will appear upon the reading the following description and referring to the appended figures briefly shown hereinunder:

FIGS. 4-$a$ (perspective view), 4-$b$ (top view) and 4-$c$ (side view) show the diagram of a kinematic chain of a first particular embodiment for a fine positioning in the three-dimensional space;

FIG. 6-$a$ (side view) and 6-$b$ (top view) show a diagram of the kinematic chain of a third particular embodiment for fine positioning in the three-dimensional space;

FIGS. 8-$a$ (perspective view) and 8-$b$ (top view) show diagrams of a kinematic chain of a first particular embodiment for the fine positioning in the two-dimensional space, FIG. 8-$c$ illustrates the improvement in the accuracy by a local calibration method; FIG. 8-$d$ is an alternative for which the additional degree of robot flexibility is inserted between the two secondary axes of rotation; FIG. 8-$e$ illustrates an alternate embodiment wherein a prismatic articulation is substituted for a secondary rotary articulation;

DETAILED DESCRIPTION OF THE EMBODIMENTS

Figure 1:
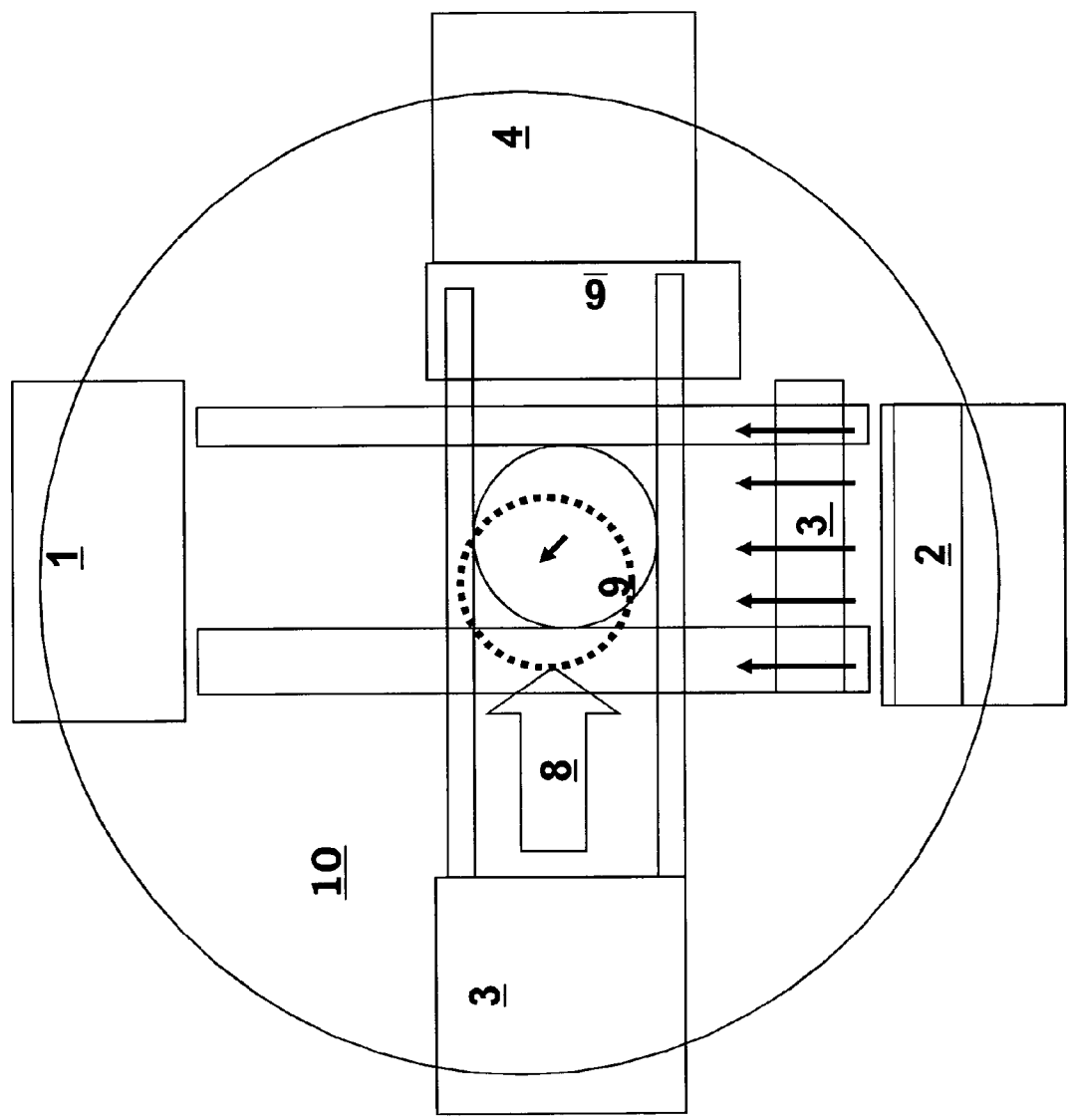
FIG. 1 relates to a fine assembling table including two laser scanning micrometers making it possible to obtain the relative positions between a shaft and a bore.
Figure 2:
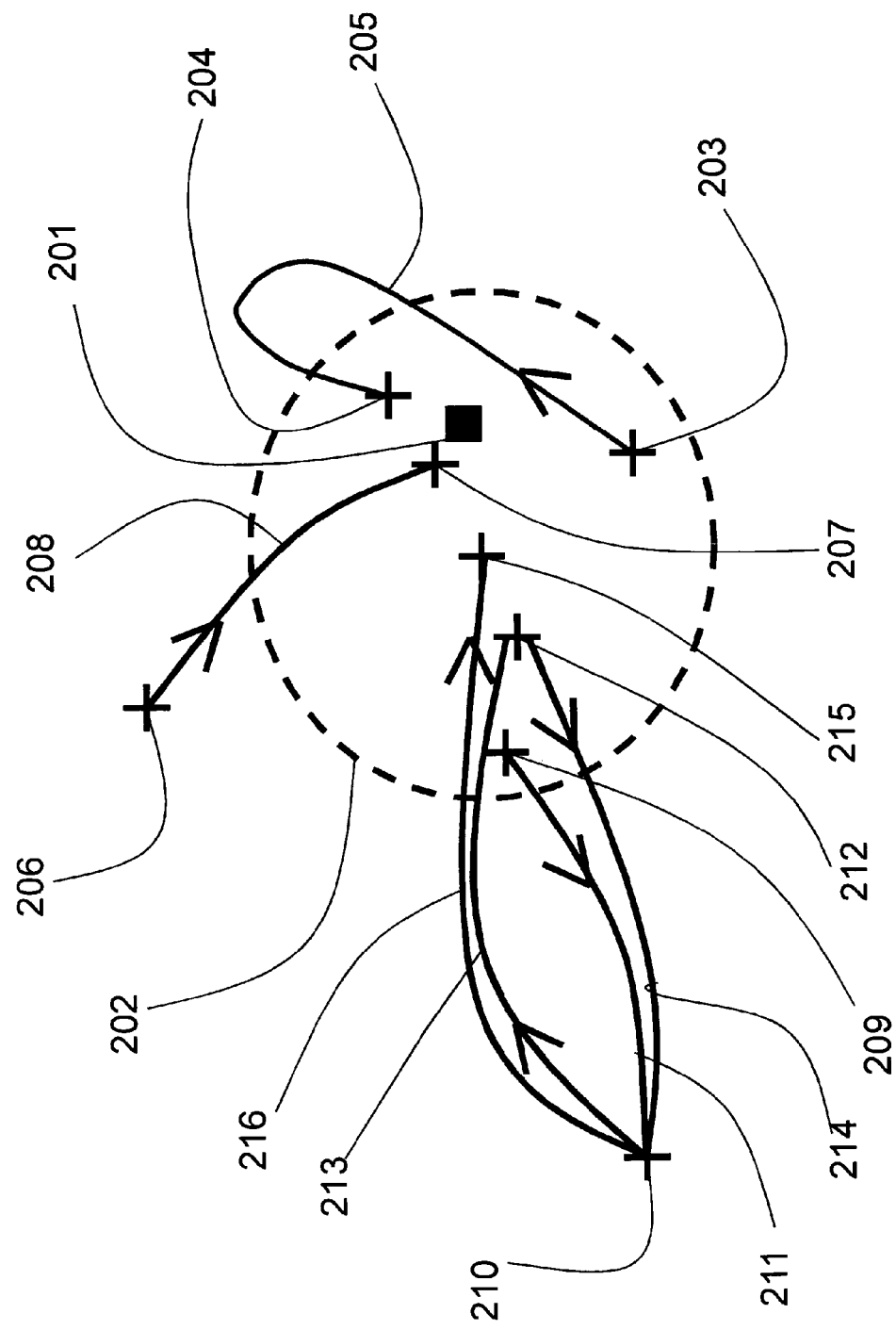
FIG. 2 illustrates various paths of motion to correct the deviation between the desired position and the reached position.
Figure 3:
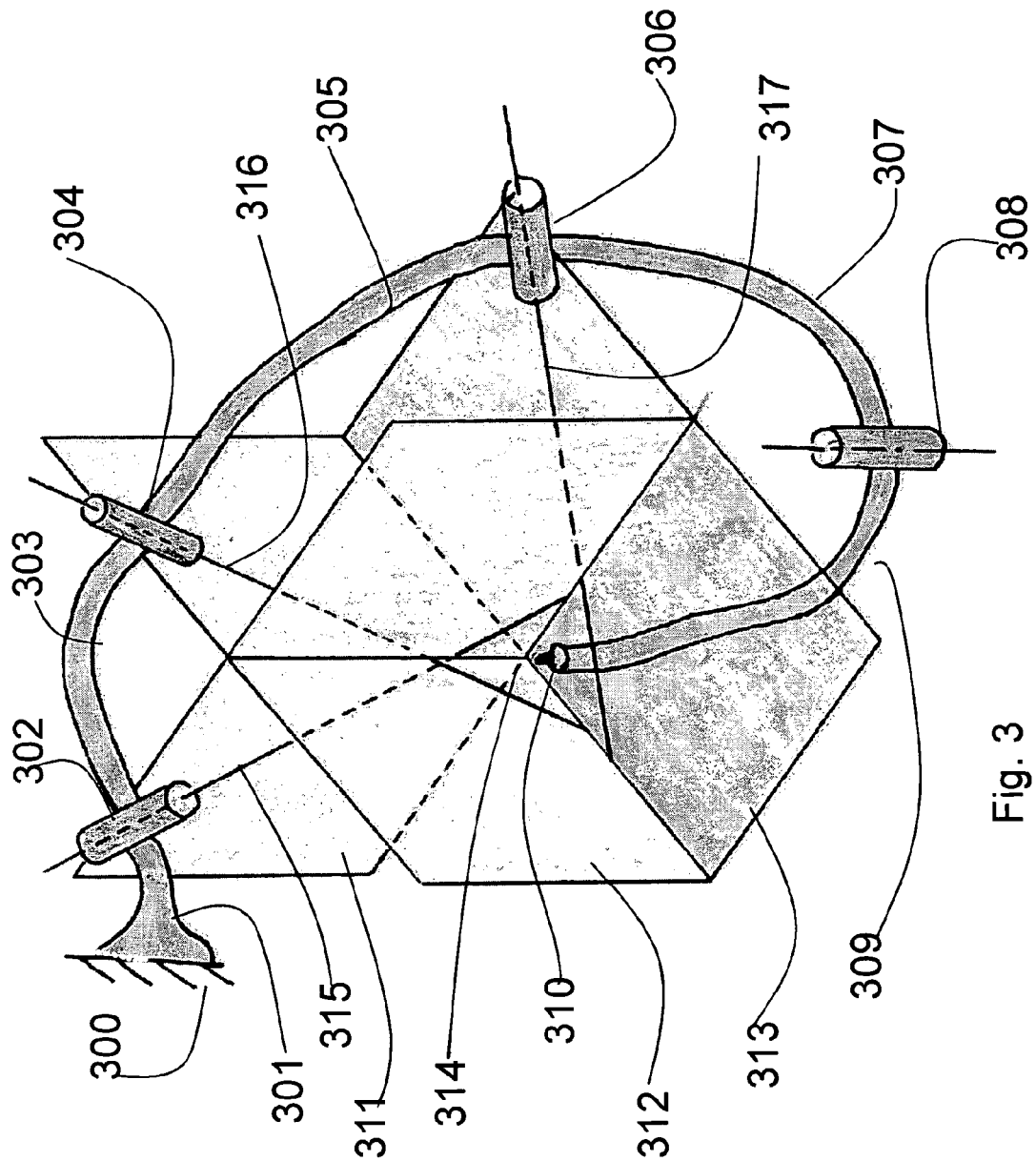
FIG. 3 shows a perspective diagram of the kinematic chain of a generic embodiment for a fine positioning in the three-dimensional space.

Referring to FIG. 3, in a general embodiment for a fine positioning in a three-dimensional space, the robot structure is composed of three rotary articulations 302, 304 and 306 also called secondary articulations, in relation with, on the one hand the frame 300 through a kinematic chain 301, and on the other hand together through the kinematic chains 303 and 305 and finally in relation with the terminal end 310 by a last kinematic chain. The global kinematic chain of the robot structure has at least one additional articulation (i.e. a fourth degree of robot flexibility) belonging to the so-called primary articulations and making it possible for the terminal end of the kinematic chain to run in a larger space than the working space related only to the secondary articulations. The fourth articulation may be inserted as desired into one of the kinematic chains 301, 303, 305 or between 306 and 310, and here this concerns the rotary link 308.

The robot structures concerned by the invention and enabling a fine positioning define, in the three-dimensional space, a so-called area of interest which corresponds to an assembly of points for which the distances with respect to the three so-called secondary axes 302, 304 and 306 are small but not null, and the movements induced by elementary rotations about the axes of rotation 302, 304 and 306 are executed along three not coplanar directions. For a particular configuration of the robot structure in this area of interest, a sub-assembly also called an optimal positioning area (OPA) is defined, the centre of which is defined as follows: this is the point of intersection 314 of three planes in space 311, 312 and 313 containing the axes of rotation 302, 304 and 306. The distances between the point 314 and the axes of rotation 302, 304 and 306 are substantially of the same order of magnitude; they are not null and small with respect to the other characteristic values of the kinematic chain defining the volume of the space which can be reached by 310. When the terminal end 310 of the robot is at point 314, the movements induced by the elementary rotations about the axes of rotation 302, 304 and 306 are executed along three perpendicular directions in space. For this particular configuration, the OPA corresponds to a sphere having a centre 314 and the radius of which is approximately equal to half the minimum distance between the point 314 and the axes of rotation 302, 304 and 306.

The structure controlling method consists in placing the terminal end 310 in the OPA using the primary degrees of robot flexibility and in blocking all the articulations except for the secondary rotation articulations 302, 304 and 306 which then make it possible to obtain a fine positioning in the OPA. The space resolution obtained at point 314 is then much finer than in the rest of the working space because of the small lever arms generated by the three secondary actions. In addition, the movements induced by the elementary rotations about the secondary axes are executed along three perpendicular directions in space and the control between the secondary articulation space and the Cartesian space is uncoupled. When getting further away from the centre of the OPA, the uncoupling tends to disappear but the advantages as regards the accuracy of the positioning remain within the OPA and more generally in the area called the area of interest.

The robot structure can also be used in a mode consisting in obtaining an accurate positioning in the three-dimensional space, whereas the three secondary axes do not exactly belong to three perpendicular planes intersecting at 314 as mentioned above, but that the previous principles of the invention are used: primary and secondary axes, small lever arms with respect to the secondary axes, movements induced by the non coplanar secondary axes. The robot structure can also be used in another embodiment consisting in obtaining a precise positioning in a plane of space using at least two axes among the secondary axes mentioned above. The robot structure can also be used in another embodiment consisting in obtaining a precise positioning on a straight line in space using at least one axis among the secondary axes mentioned above.

While referring to FIGS. 4-a, 4-b and 4-c in a particular embodiment enabling the positioning of the terminal end in the three-dimensional space with a very high precision, the robot structure is composed of two parallel axes of rotation 402 and 404 and of two parallel axes of rotation 406 and 408 which are perpendicular to the axes of rotation 402 and 404. The plane 413 contains the axis 406 and is perpendicular to the axis 402. The point 410 is the intersection of the plane 413 with the axis 402. The point 411 is the intersection of the plane 413 with the axis 404. The distance between the axes 404 and 406 is equal to the distance between the axes 402 and 404 multiplied by the ratio 0.2. The distance between the axes 406 and 408 is equal to the distance between the terminal end 310 and the axis 408 from which 0.7 times the distance between the axes 402 and 404 is deducted, so that both distances remain within the same order of amplitude. We are looking for a "length of the arm 407/length of the arm 403" ratio, which must be as high as possible. According to the industrial use of such a robot arm and according to the characteristics of the working space wherein the robot arm will be used, the persons skilled in the art have to optimise the above ratio. The persons skilled in the art can arbitrarily choose a length of the arm 407 and divide it by 10 to obtain the length of the arm 403. The distance of the axis 402 to the base of the robot 400 is not an essential criterion and will be determined as a function of the constraints within the working space. 402 may be directly fixed on the base 400 without any intermediate arm 401.

The method for controlling such a structure consists in driving the axes of rotation 402, 406 and 408 in order to position the terminal end 310 in the area of interest close to the axes 402, 404 and 406. Ideally, the persons skilled in the art will try to position the terminal end 310 close to the centre 412 of the OPA. The centre of the OPA is an apex 412 of an isosceles right-angled triangle of the plane 413, the hypotenuse of which is the segment connecting the point 410 and the point 411. The distance between 412 and the axis of rotation 406 is equal to the distance between 412 and 410. Depending on the configurations of the primary articulations, the point 412 may have various positions in space. For a given configuration, the OPA corresponds to a sphere with a centre 412 and the radius of which is substantially equal to half the distance between 410 and 412. The positioning of the terminal end in the OPA aims at minimising the lengths of the lever arms associated with the axes of rotation 402, 404 and 406 with respect to the terminal end 310, but without cancelling these so that the end of the manipulator arm can be controlled in the three-dimensional space of the secondary axes. Once 310 is positioned within the OPA, the axis 408 is blocked. Then the axes 402, 404 and 406 are activated so as to obtain a fine positioning in space. As regards the point 412, the elementary movements induced by the rotations of the axes 402, 404 and 406 are carried out in three perpendicular directions. In addition, with equal controls and resolutions on the angular sensors of the secondary axes, the position increments resulting from the elementary rotations of the secondary axes are identical in the three perpendicular directions. If the terminal end is further away from the point 412 while remaining within the OPA, the elementary movements are no longer necessarily orthogonal but remain linearly independent, and with equal control and resolutions on the angular sensors, the position increments can substantially vary. However, the advantages as regards the improvement in the accuracy of the positioning are not affected.

The space resolution is in relation with the digital control resolution, with the performances of the actuators control system characterized, among other things, by the covariance matrix and the proprioceptive sensors resolution and to the space configuration of the robot arm. On the modern systems, the resolution of the digital control can be considered as quasi-continuous thanks to the double precision processing by the computer. The robot structure shown makes it possible to obtain a much finer space resolution and a much better reproducibility within the OPA than in the remainder of the working space by controlling the axes 402, 404 and 406.

Because the axes 402 and 404 are parallel, the redundancy of the robot structure causes no particular problem for the control of the mechanism during both phases of the prepositioning and the fine positioning. As a matter of fact, driving a redundant robot is always difficult since this requires integrating additional criteria in the control process (optimising the energy criterion for example). Then, during the prepositioning phase, the axes 402, 406 and 408 can be driven only with the only aim of bringing the terminal end in the OPA; during this phase the robot structure has a conventionally revertible geometric model. During the fine positioning phase, the axes 402, 404 and 406 only are actuated and the geometric model is still conventionally locally revertible.

Figure 5A:
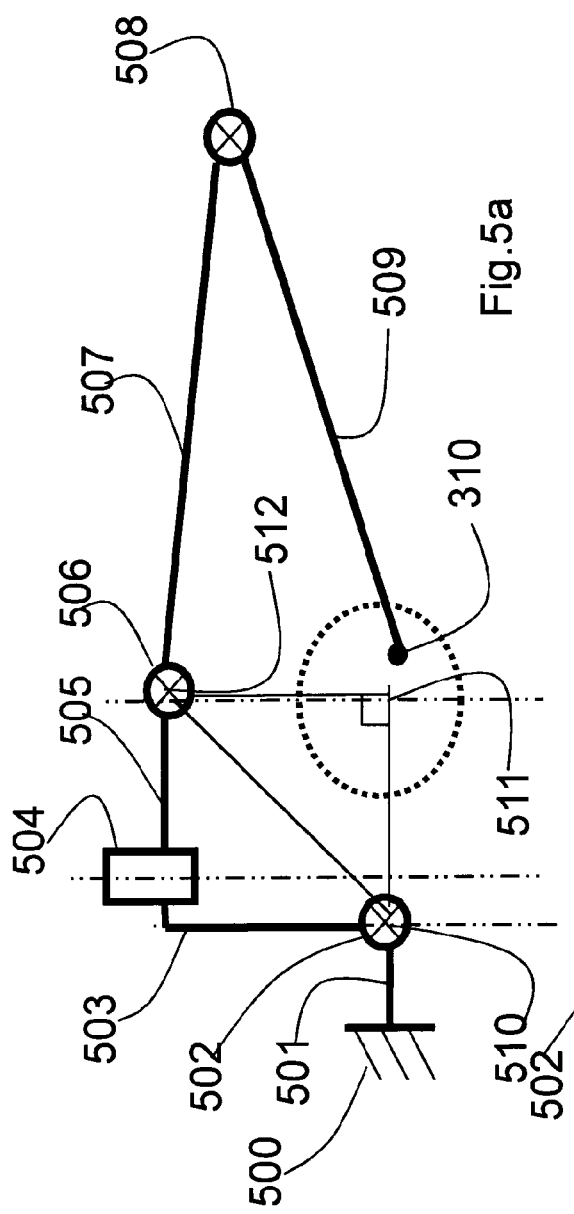
FIGS. 5-$a$ (side view) and 5-$b$ (top view) show a diagram of the kinematic chain of a second particular embodiment for a fine positioning in the three-dimensional space.
Figure 5B:
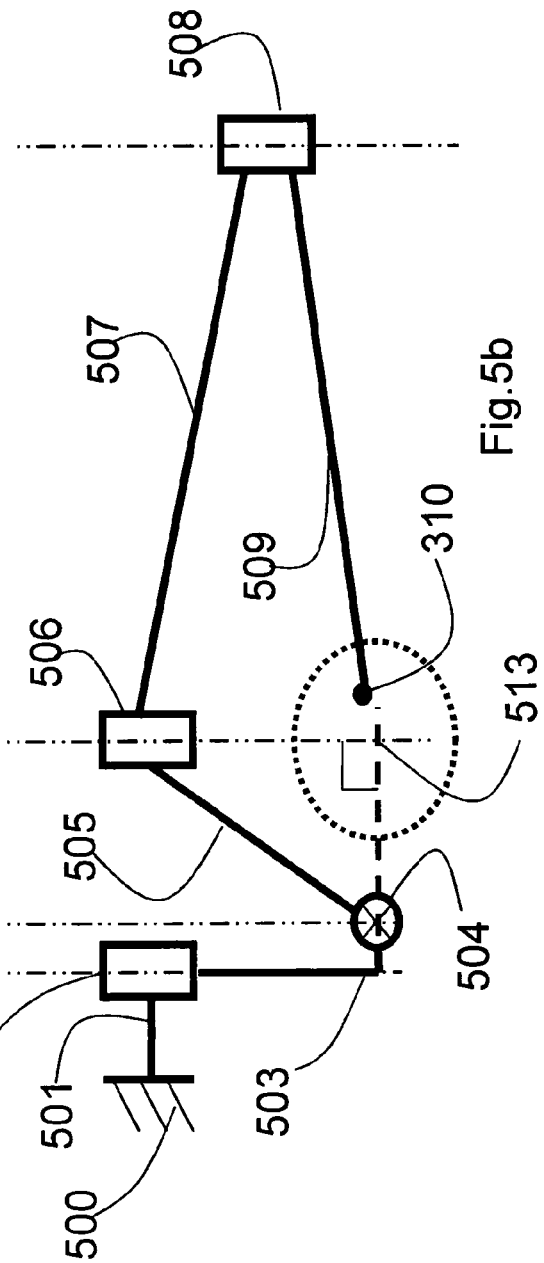

While referring to FIGS. 5-a and 5-b, in a particular embodiment, the robot structure for an accurate positioning of a terminal end of the robot in the three-dimensional space is composed in a reference configuration of three parallel axes 502, 506 and 508, and one axis 504 perpendicular to 502, 506 and 508. Except in the reference configuration, the axes 506 and 508 are always parallel but they are no longer necessarily parallel to the axis 502. As for the dimensions of this structure, the persons skilled in the art will try to obtain a length of the arm 507/length of the arm 505 ratio as high as possible while considering the constraints in the working space. The lengths of the arms 507 and 509 are substantially equal to each other within 10%. The length of the arm 507 is, for lack of constraints, at least 10 times longer than the distance between the axes 504 and 506.

The control of such structure will be identical in every point to the previous structure, starting with the positioning of the terminal end 310 in the area of interest through the action of the axes of rotation 504, 506 and 508. Then, once the end 310 is positioned, the axis 508 is blocked and the accurate positioning occurs thanks to the simultaneous actuation of 502, 504 and 506.

While referring to FIGS. 6-a and 6-b, in a particular embodiment, the robot structure for an accurate positioning of a terminal end of the robot in a three-dimensional space is composed of three parallel axes 604, 606 and 608 and one axis 602 perpendicular to 604, 606 and 608. To size this structure, the persons skilled in the art will try to obtain a length of the arm 607/length of the arm 605 ratio as high as possible while considering the constraints in the working space. Lengths of the arms 607 and 609 are substantially within 10%. The length of the arm 607 is, for lack of constraints, at least 10 times greater than the length of the arm 605.

The control of such structure will be identical in every point to the previous structures, starting with the positioning of the terminal end 310 of the arm in the area of interest through the action of the axis of rotation 602, 606 and 608 (or the axes of rotation 602, 604 and 608). And once the end 310 is positioned, the axis 608 is blocked and the accurate positioning occurs thanks to the joint actuation of 602, 604 and 606.

Figure 7:
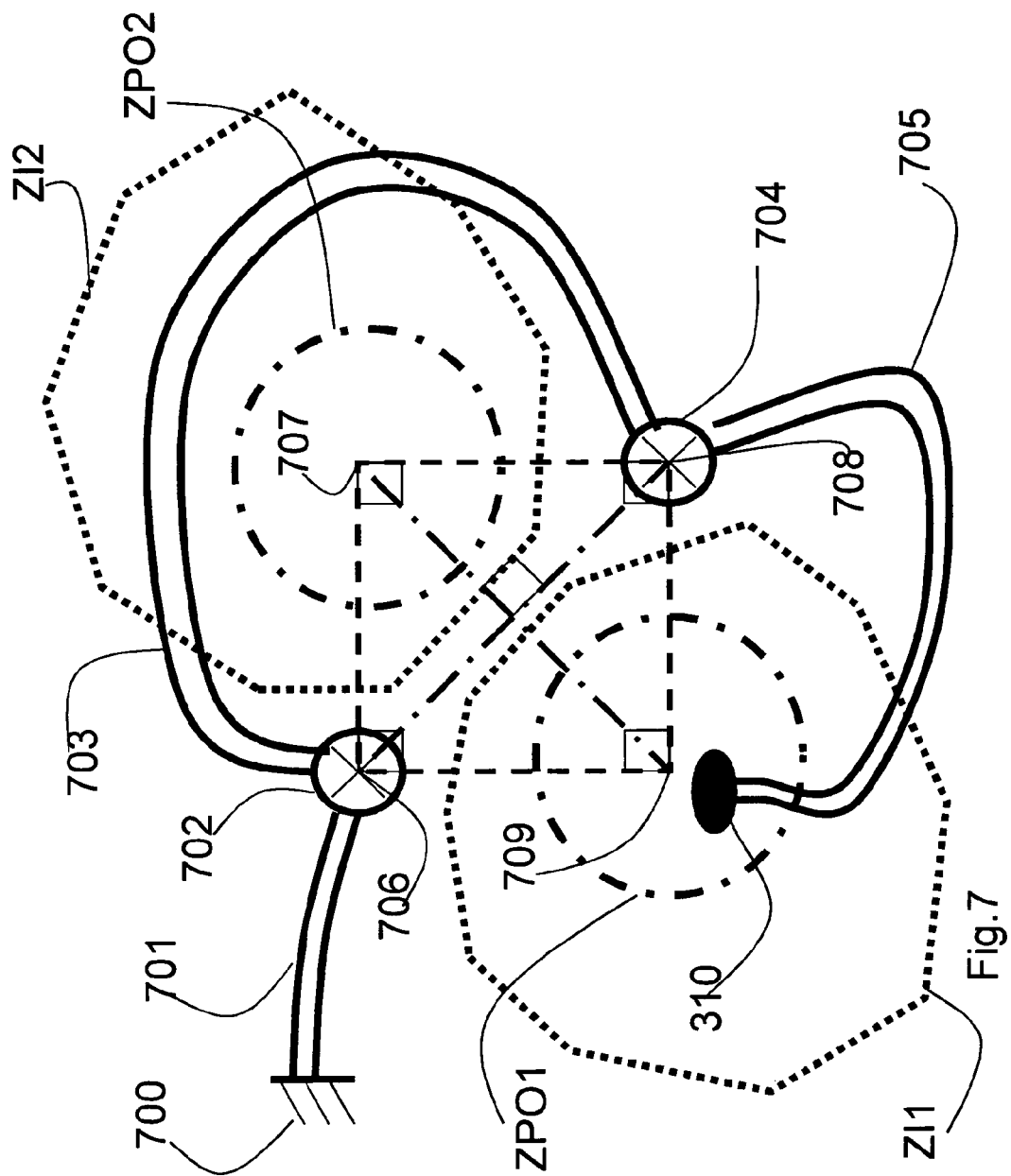
FIG. 7 shows a kinematic chain of a generic embodiment for the accurate positioning of the terminal end in one plane of space.

While referring to FIG. 7, in a generic embodiment enabling the positioning of the terminal end 310 and the robot structure in one plane (P) in space, the structure is composed of three kinematic chains 701, 703 and 705 and two axes of rotation 702, 704 perpendicular to the plane (P). The kinematic chain 701 connects the rotary link 702 to the support 700; the kinematic chain 703 connects the two rotary connections 702 and 704; the kinematic chain 705 connects the rotary link 704 to the terminal end 310. An additional degree of robot flexibility in the plane (in rotation or in translation) is then integrated in at least one of the kinematic chains 701, 703 or 705. This degree of robot flexibility aims at significantly widening the space which can be reached by the end 310 with respect to the space that can be reached by a robot structure of the SCARA type based on the articulations 702 and 704.

The point 706 is the intersection between the plane (P) and the axis 702. The point 708 is the intersection between the plane (P) and the axis 704. The square of the plane (P) a diagonal of which connects the point 706 and 708 defines two new apexes 707 and 709. In this general case and for a given configuration of the so-called secondary axes of rotation 702 and 704, there are OPAs (indicated by OPA1 and OPA2) the centres of which are points 707 and 709. OPAs are discs centred on 707 and 709 the radius of which is equal to half the distance between 706 and 709.

The control of such structure is as follows: —Placing the end 310 in the OPA by actuating the primary articulations which include all the degrees of robot flexibility of the kinematic chains; —Blocking all the degrees of robot flexibility except for the secondary rotations along the axes 702 and 704; —Executing the fine positioning by actuating the axes 702 and 704. Then, if the terminal end 310 is, for example, at 709, the elementary movement induced by the rotations of the axes 702 and 704 are carried out along two perpendicular directions in the plane (P) from 709 to 706 and from 709 to 708. In addition, with equal control and resolution on the angular sensors of the axes 702 and 704, the position increments are identical in both perpendicular directions. If the terminal end 310 moves further away from the point 709 while remaining within the OPA1, the elementary movements are no longer necessarily perpendicular to each other but remain linearly independent and with an equal resolution on the angular sensors, the induced position increments may substantially vary. However, the advantages as regards the improvement in the accuracy of the positioning remain unaffected.

In a wider area than the OPA called the area of interest (ZI1 and ZI2), the short distance with the axes 702 and 704 makes it possible to obtain certain advantages during the fine positioning with performances which are indeed degraded with respect to the OPA but are often more interesting than in the remainder of the working space. Unless specific applications, the point 310 should not be positioned at the centre of the segment having ends 706 and 708, since the elementary movements induced by the elementary rotations of the secondary axes 702 and 704 are then linearly dependent (local singularity) along the direction linking points 707 to 709. The OPA depends on the configurations of the robot structure and also on the strategy of the positioning and moving the end of the arm and, if need be, the tool supported with respect to the part to be processed. In a previous step, it is still possible to select with some latitude the position of the centre of the OPA in the working space by acting on some primary degrees of robot flexibility. A motorized prismatic articulation along a parallel axis of articulation 702 can be added at the end of the kinematic chain 705 enabling a fine positioning in the three-dimensional space, with this principle being illustrated by the particular embodiment of FIG. 10.

While referring to FIGS. 8-a and 8-b, in a particular embodiment making it possible to position the terminal end of the robot structure in a plane space, with the structure being composed of three rotary links 802, 804 and 806 perpendicular to the plane 811 and thus parallel to each other. The rotary connection 802 is anchored on the one hand on a support integral with space 800 by one arm 801 and on the other hand it is in relation with the rotary 804 by one arm 803. An arm 805 supports the rotary links 804 and 806. The rotary link 806 controls the arm 807. The terminal end to be positioned 310 is integral with the arm 807. The lengths of the mars 805 and 807 are substantially equal to each other with a tolerance in the order of half the length of the arm 803. The persons skilled in the art will try to obtain a length of 805/length of 803 ratio as high as possible while considering the constraints in the working space. Without constraint, the persons skilled in the art will consider the length of the arm 803 as at least ten times smaller than that of the arm 805. The length of the arm 805 is selected as a function of the size of the working space desired.

The plane 811 contains the point 310 and is perpendicular to the axes of rotation 802, 804 and 806. In this case, the centre of the OPA is the apex 810 of an isosceles right-angled triangle inscribed within the plane 811, the ends of the hypotenuse of which are the point of intersection 808 of the plane 811 with the axis 802 and the point of intersection 809 of the plane 811 with the apex 804. Depending on the configurations of the axes 802 and 804, the point 810 may occupy various positions in space. For a given configuration, the area of interest corresponds to a disc with a centre 810 and the radius of which is substantially equal to half the distance between 810 and 808.

The control of such structure is operated as follows: —Blocking the axis of rotation 802; —Placing the end 310 in the area of interest by actuating 804 and 806; —Blocking 806; —Carrying out the fine positioning by actuating 802 and 804. Then, if the terminal end 310 is at point 810, the elementary movements induced by the rotations of the axes 802 and 804 are carried out along two perpendicular directions in the plane 811 (from 810 to 808 and from 810 to 809). In addition, with equal control and resolutions on the angular sensors of the axes 802 and 804, the position increments are identical in these two perpendicular directions. In a previous step, it is possible to select the position of the centre of the OPA by actuating axis 802. If the terminal end 310 gets further away from the point 810 while remaining within the OPA, the elementary movements are no longer necessarily orthogonal, but remain linearly independent and with an equal resolution on the angular sensors, the induced position increments may substantially vary. However, the advantages as regards improvement and accuracy of the positioning remain unaffected.

While referring to FIG. 8-c, the accuracy in the positioning may be significantly improved in the area of interest by using a local calibration process after the prepositioning phase. Two exteroceptive sensors 812 and 813, for example digital micrometers, make it possible to know precisely the position of the terminal end 310 in the area of interest. During the step of fine positioning, with the articulation 806 blocked, the movements are carried out only from the axes 802 and 804. The secondary geometric model connecting the angular movements of the secondary axes with the Cartesian movements in the plane can be rebuilt from the distances evaluated between 804 and 310. Starting from the new reference in the local reference system thanks to this calibration operation, the movements on a path of motion 814 as from the position of 310 during the calibration are estimated by the secondary geometric model. Because of the small lengths of the lever arms with respect to the secondary axes, because the resolutions the sensors placed on the secondary axes are generally better than on the non secondary axes, because of the small distances between the secondary axes 802 and 804, because of the calibration operation, the performances as regards the positioning accuracy within the area of interest are then much better than when the estimation of the position is computed from the geometric model taking into account all the primary articulations.

While referring to FIG. 8-d, in a particular embodiment enabling the positioning of the terminal end of the robot structure in a plane of the space, the structure is composed of three rotary connections 802, 804 and 806 with 802 and 806 being secondary axes of rotation and 804 being only a primary axis of rotation. The centre 810 of the OPA is defined as mentioned above with respect to the secondary axes 802 and 806. The control method consists in blocking 804 when the prepositioning phase is completed and in activating the secondary axes 802 and 806 only during the fine positioning phase. Unlike the previous case, it is possible to modify the position of the centre 810 of the OPA with respect to the secondary axes of rotation by acting on the distance between the axes 802 and 806, depending on the angular setting given for the axis 804. This makes it possible during the fine positioning phase to reduce or to improve the sensitivity of the movements along both perpendicular directions. Another advantage is that such device can be integrated on existing SCARA robots, with the terminal part composed of the arm 807 and 310 which can be considered as a tool mounted on the end of the SCARA robot having a sufficient resolution on the axis 806. The drawbacks are that the terminal end 310 cannot be placed at the centre of the OPA only for a particular value of the angular setting given for the axis 804.

In an alternative solution of the previous structure, the axes of rotation 802, 804 and 806 are not necessarily strictly parallel, however the movements of the terminal end during the fine positioning phase by actuating the secondary axes remain coplanar and the advantages of the structure as regards the performances in accuracy remain within an OPA which can be defined similarly to the previous case. While referring to FIG. 8-e, in a particular embodiment making it possible to position the terminal end of the robot structure in a plane of the space, the secondary articulations are a vertical rotary link 802 and a horizontal prismatic link 816; the adjustment of the final position being provided by the small lever arm of the articulation 802 which gives an optimal resolution along a direction and by the prismatic articulation 816 in the perpendicular direction. Adding an additional vertical prismatic connection to provide a fine positioning in a three-dimensional space can be considered.

Figure 9:
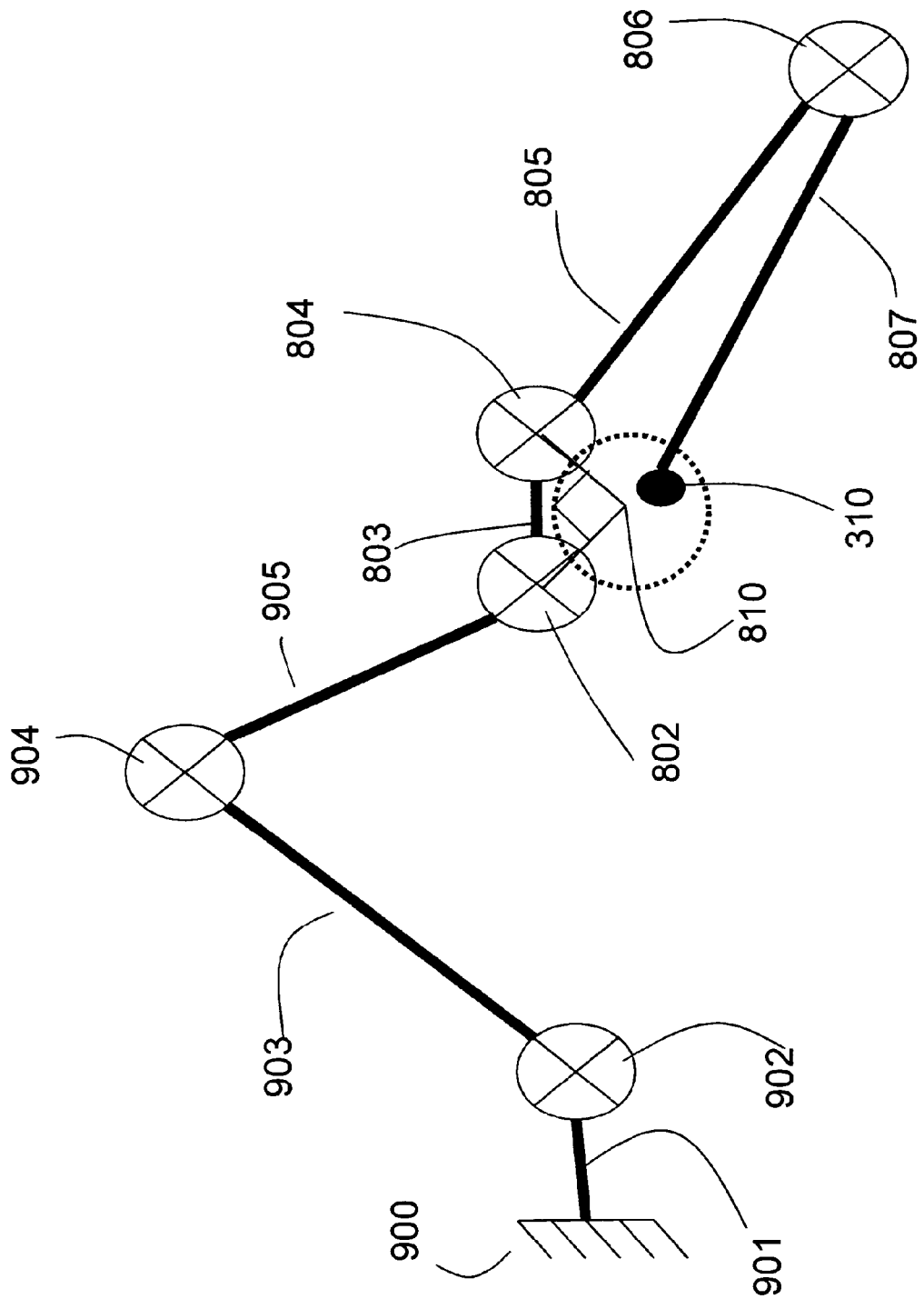
FIG. 9 (top view) shows a diagram of the kinematic chain of a second particular embodiment for a fine positioning in the two-dimensional space, making it possible to define the area of interest and to accurately position the terminal end of the robotized arm in this area.

While referring to FIG. 9, in a particular embodiment enabling the positioning of the terminal end of the robot structure in a plane of the space (P), with the possibility of defining more widely the OPA, the structure is composed of 5 rotary connections 902, 904, 802, 804, 806 which are all parallel to each other. In this structure, the kinematic chain 902-903-904-905 corresponds to a robot structure of the SCARA type, whereas the kinematic chain 802-804-805-806-807-310 can be compared to the previously disclosed structure for a precise positioning in a plane.

The control of such a structure starts with a step of defining the OPA in the plane space thanks to the rotary connections 902 and 904. The centre 810 of the OPA can thus be positioned by the persons skilled in the art in an arbitrary area of the working space of a SCARA robot composed by the kinematic chain 902-903-904-905.

The persons skilled in the art can then go on with the accurate positioning according to the previously disclosed method after selecting the centre of the OPA thanks to 902 and 904. The selection of the dimensions must be made so that all the areas of interest desired by the persons skilled in the art belong to the space which can be reached by the SCARA robot corresponding to the kinematic chain 902-903-904-905. The distribution of the lengths between 903 and 905 is estimated by the persons skilled in the art. Lacking constraints, both arms will have identical lengths. This structure advantageously enables to carry out a fine positioning in a wider area of the working space by reproducing, if necessary, the steps of positioning the centre of the OPA, the prepositioning and the fine positioning of the terminal end of the robot arm so as to position the centre of the OPA as close as possible to the desired target.

Figure 10:
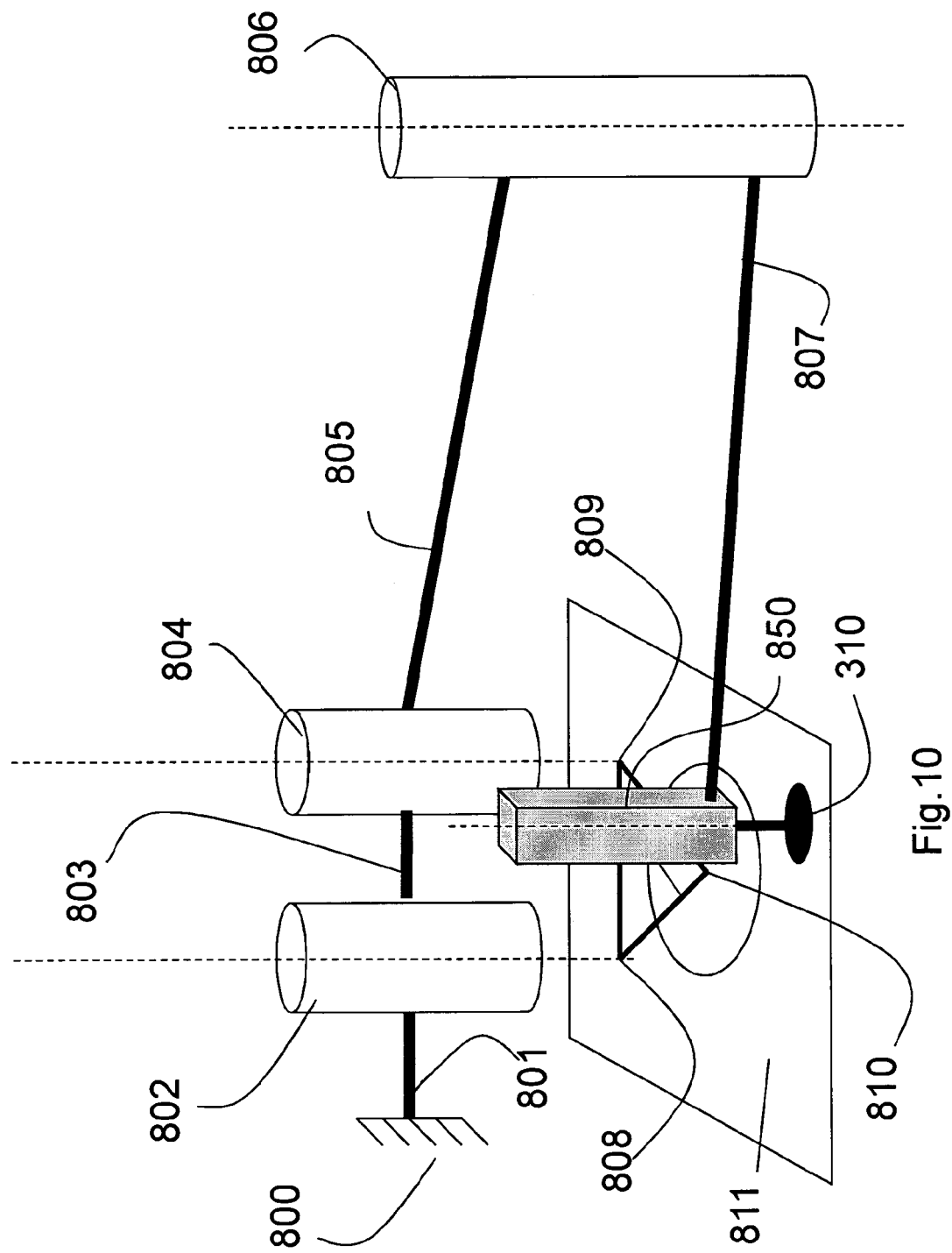
FIG. 10 (top view) shows a diagram of the kinematic chain of a particular embodiment for a fine positioning in the three-dimensional space wherein one of the secondary articulations is prismatic.

While referring to FIG. 10, in one embodiment enabling the positioning of the terminal end of the robot structure in the three-dimensional space, the structure is composed of 3 rotary connections 802, 804, 806, which are all parallel together and of a prismatic connection 850 along an also parallel axis, with the fine positioning being obtained by elementary movements of the secondary articulations 802, 804 and 850, with the articulation 806 being blocked after the prepositioning phase.

Figure 11:
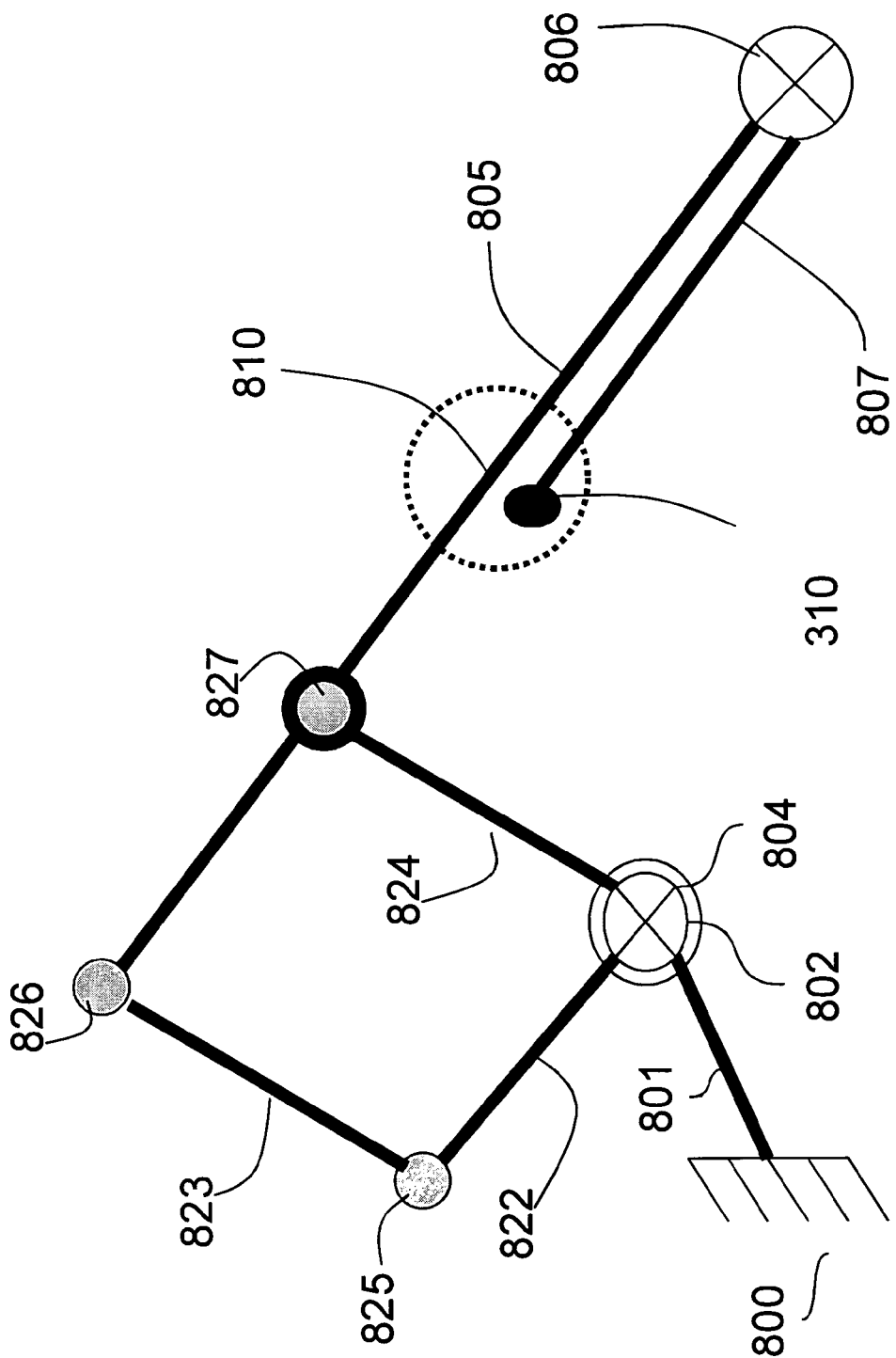
FIG. 11 (top view) shows a diagram of a kinematic chain of a particular embodiment corresponding to a hybrid robot structure for a fine positioning in a plane.

While referring to FIG. 11, in one embodiment relating to a hybrid robot structure enabling the positioning of the terminal end in a plane, the structure is composed of three motorized rotary connections 802, 804 and 806, and three passive rotary connections 825, 826 and 827. The motorized rotary articulation 802 controls the angular position of the segment 822 and the rotary articulation 804 controls the angular position of the segment 824. The segments 822, 823, 824 and the part of the segment 805 between the articulations 826 and 827 form a parallelogram, ideally a diamond. The centre 810 of the OPA is positioned on the segment 805 in a symmetrical position of the articulation 826 with respect to the articulation 827. The control method consists in blocking 806 after the prepositioning phase and then in actuating the secondary axes 802 and 804 in the fine positioning phase only. Adding a motorized prismatic connection along an axis parallel to 802 at the end of the segment 807 so as to finely position the terminal end 310 in the three-dimensional space can be considered.

The invention claimed is:

1. A robot comprising:
an articulated arm having a terminal end, for the movement of the terminal end to a target point in an N-dimensional working space comprising at least N+1 motorized articulations defining a kinematic chain, and a computer for controlling the movements of the motorized articulations, the computer controlling a first prepositioning of the terminal end of the articulated arm and a fine positioning;
a first prepositioning including engaging the terminal end into an area of interest of the working space, as close as possible to a center of an optimum positioning area within the area of interest, the center being defined as a function of N secondary motorized articulations, the N secondary motorized articulations being selected among the at least N+1 motorized articulations; and
the fine positioning including prohibiting all the movements of all the articulations except for the N secondary motorized articulations and controlling the movement of the terminal end through elementary movements of at least one of the N secondary motorized articulations, with at least one of the N secondary motorized articulations having an axis of rotation,
the robot being such that, at least in one given configuration, the N secondary motorized articulations are not exclusively the last N articulations of the kinematic chain.

2. The robot according to claim 1, wherein the articulated arm for the positioning in a three-dimensional space includes at least four motorized articulations among which at least three secondary motorized axes of rotation, with the prepositioning includes bringing the terminal end of the robot to an area of interest, the area of interest being a sub-assembly of the working space, and the fine positioning includes prohibiting all the movements of all the motorized articulations except for the axis of the secondary motorized articulations and in carrying out the fine positioning through elementary movements by rotation of at least one of the secondary motorized articulations.

3. The robot according to claim 1, wherein the articulated arm for a positioning in a three-dimensional space includes at least four motorized articulations, among which at least two axes of rotation, with the prepositioning includes bringing the terminal end of the robot to the area of interest, the area of interest being a sub-assembly of the working space, and the fine positioning includes prohibiting all the movements of all the motorized articulations except for three secondary motorized articulations, among which the at least two axes of rotation and carrying out the fine positioning through elementary movements of at least one of the secondary motorized articulations.

4. The robot according to claim 1, wherein the articulated arm for a positioning in a three-dimensional space includes at least four motorized articulations, among which at least one axis of rotation, with the positioning includes bringing the terminal end of the robot to the area of interest, the area of interest being a sub-assembly of the working space, and the fine positioning includes prohibiting all the movements of all the motorized articulations except for three secondary motorized articulations among which the axis of rotation and carrying out the fine positioning through elementary movements of at least one of the secondary motorized articulations.

5. The robot according to claim 1, wherein the articulated arm includes at least three motorized articulations, among which at least two of the axes of secondary motorized articulations which are parallel to each other, and the prepositioning includes bringing the terminal end of the robot to the area of interest, the area of interest is a disc, the center of which is the apex opposed to the hypotenuse of an isosceles right-angled triangle included in a plane containing the terminal end of the handling arm and perpendicular to the secondary axes of rotation, with the hypotenuse having a first apex on a first secondary axis of rotation and a second apex on a second secondary axis of rotation; the diameter of the disc is equal to a distance between the two secondary axes of rotation, with the fine positioning includes prohibiting all the movements of all the motorized articulations except for the axes of secondary motorized articulations and in executing the fine positioning through elementary movements by rotation of the axes of secondary motorized articulations.

6. The robot according to claim 1, wherein the articulated structure includes at least three motorized articulations, among which at least two axes of secondary motorized articulation which are parallel to each other, and wherein the prepositioning includes bringing the terminal end of the robot to the area of interest; the fine positioning including prohibiting all the movements of all the motorized articulations except for the axes of secondary motorized articulations and in executing the fine positioning through elementary movements by rotation of at least one of the axes of the secondary motorized articulations.

7. The robot according to claim 1, wherein an articulated arm for a positioning in a plane of the space includes at least three motorized articulations, among which at least one axis of secondary motorized articulations, with the prepositioning includes bringing the terminal end of the robot to the area of interest, with the area of interest is a sub-assembly of the working space, and the fine positioning includes prohibiting all the movements of all the articulations except for two secondary motorized articulations, among which the at least one axis of the secondary motorized articulations, and in carrying out the fine positioning through elementary movements of at least one of the secondary motorized articulations.

8. The robot according to claim 1, further comprising at least one additional articulation located upstream of the kinematic chain, wherein the at least one additional articulation operates for defining the area of interest during a preliminary step prior to the first prepositioning.

9. The robot according to claim 1, wherein the fine positioning is indirectly obtained through the reproduction of a portion of a path of motion from a particular point called a point of harmonization to the target point, so as to solve the problems of dry frictions, with the point of harmonization being a point located out the dead zone in relation with the target point, a final setting being adjusted by taking into account the deviation between a reached position and the target point.

10. The robot according to claim 9, wherein the fine positioning is obtained by processing exteroceptive information making it possible to deduce a distance between the position of the terminal end of the robot and the target point, and to control the robot by elementary movements of the secondary motorized articulations.

11. The robot according to claim 1, wherein the first prepositioning and the fine positioning are computed prior to the execution in order to prepare a control law for a continuous movement.

12. The robot according to claim 1, wherein the first prepositioning and the fine positioning are computed prior to the execution in order to prepare a control law and a periodical re-computing in the course of the movement.

13. The robot according to claim 1, wherein the control of the redundant robot for the fine positioning uses a local calibration process for a better accuracy of the positioning upon completion of the first prepositioning.

14. The robot according to claim 1, further comprising a wrist fixed to the terminal end of the articulated arm enabling to control the orientation of an object or a tool.

15. The robot according to claim 1, wherein the at least one of the N secondary motorized articulations is such that, at least in one given configuration, each distance between each axis of the secondary motorized articulations and the terminal end is smaller than distances between each axis of rotation of the non-secondary motorized articulation among the at least N+1 motorized articulations and the terminal end.

16. A method for moving a terminal end of an articulated arm of a robot to a target point in an N-dimensional working space comprising at least N+1 motorized articulations that define a kinematic chain, the method comprising:
 a first step of prepositioning of the terminal end of the articulated arm further comprising engaging the terminal end of the articulated arm into an area of interest of the working space, as close as possible to a center of an optimum positioning area within the area of interest, the center being defined as a function of N secondary motorized articulations, the secondary motorized articulations being selected among at least N+1 motorized articulations; and
 a second step of fine positioning comprising in prohibiting all the movements of all the motorized articulations except for the N secondary motorized articulations and in controlling the movement of the terminal end through elementary movements of at least one of the N secondary motorized articulations, at least one of which is an axis of rotation, the N secondary motorized articulations not being exclusively the last N motorized articulations of the kinematic chain.

17. The method of moving an end of an articulated arm of a robot according to claim 16, wherein the at least one of the secondary motorized articulations is such that, at least in one given configuration, each distance between each axis of the secondary motorized articulations and the terminal end is smaller than distances between each axis of rotation of the non-secondary motorized articulation among the at least N+1 motorized articulations and the terminal end.

* * * * *